United States Patent
Xue et al.

(10) Patent No.: US 11,026,191 B2
(45) Date of Patent: Jun. 1, 2021

(54) SERVICE TRANSMISSION METHOD, DEVICE, AND SYSTEM

(71) Applicant: Huawei Technologies Co., Ltd., Shenzhen (CN)

(72) Inventors: Yifan Xue, Beijing (CN); Jian Wang, Beijing (CN); Da Wang, Shenzhen (CN); Yun Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/620,332

(22) PCT Filed: Jun. 16, 2017

(86) PCT No.: PCT/CN2017/088823
§ 371 (c)(1),
(2) Date: Dec. 6, 2019

(87) PCT Pub. No.: WO2018/227636
PCT Pub. Date: Dec. 20, 2018

(65) Prior Publication Data
US 2020/0374817 A1 Nov. 26, 2020

(51) Int. Cl.
*H04W 52/14* (2009.01)
*H04W 52/34* (2009.01)
(Continued)

(52) U.S. Cl.
CPC ........... *H04W 52/42* (2013.01); *H04L 5/001* (2013.01); *H04L 5/0032* (2013.01);
(Continued)

(58) Field of Classification Search
CPC . H04W 52/146; H04W 52/34; H04W 52/367; H04W 72/0446; H04W 52/16;
(Continued)

(56) References Cited

U.S. PATENT DOCUMENTS

2008/0075027 A1 3/2008 Lee et al.
2013/0044621 A1 2/2013 Jung et al.
(Continued)

FOREIGN PATENT DOCUMENTS

| CN | 101183888 A | 5/2008 |
|----|-------------|--------|
| CN | 102149182 A | 8/2011 |

(Continued)

OTHER PUBLICATIONS

Machine Translation and Abstract of Chinese Publication No. CN102149182, Aug. 10, 2011, 13 pages.
(Continued)

*Primary Examiner* — Philip Sobutka
(74) *Attorney, Agent, or Firm* — Conley Rose, P.C.

(57) ABSTRACT

A method for power control during service transmission includes sending, by a user equipment (UE), a first signal on a first symbol set on a first carrier using a first transmit power, and sending, by the UE, a second signal on a second symbol set on a second carrier using a second transmit power. A time resource on the first symbol set overlaps with a time resource on the second symbol set. The first transmit power is a transmit power configured by a first base station. The second transmit power is less than or equal to a transmit power configured or indicated by a second base station.

20 Claims, 11 Drawing Sheets

(51) Int. Cl.
*H04W 52/42* (2009.01)
*H04L 5/00* (2006.01)

(52) U.S. Cl.
CPC ......... *H04L 5/0044* (2013.01); *H04W 52/146* (2013.01); *H04W 52/346* (2013.01)

(58) Field of Classification Search
CPC ............. H04W 52/325; H04W 52/346; H04W 52/365; H04W 72/0413; H04W 72/04; H04W 52/04; H04W 52/38; H04B 17/309
USPC .......................................................... 455/522
See application file for complete search history.

(56) References Cited

U.S. PATENT DOCUMENTS

2016/0295574 A1    10/2016    Papasakellariou
2017/0280440 A1*    9/2017    Oh ...................... H04W 74/006

FOREIGN PATENT DOCUMENTS

| CN | 102238716 A | 11/2011 |
|---|---|---|
| CN | 103220768 A | 7/2013 |
| WO | 2015139032 A1 | 9/2015 |
| WO | 2015139269 A1 | 9/2015 |
| WO | 2016137816 A2 | 9/2016 |

OTHER PUBLICATIONS

Machine Translation and Abstract of Chinese Publication No. CN102238716, Nov. 9, 2011, 22 pages.
Machine Translation and Abstract of Chinese Publication No. CN103220768, Jul. 24, 2013, 39 pages.

* cited by examiner

SERVICE TRANSMISSION METHOD, DEVICE, AND SYSTEM

CROSS-REFERENCE TO RELATED APPLICATIONS

This application is a U.S. National Stage of International Patent Application No. PCT/CN2017/088823 filed Jun. 16, 2017, which is hereby incorporated by reference in its entirety.

TECHNICAL HELD

This application relates to the communications field, and in particular, to a service transmission method, a device, and a system.

BACKGROUND

In recent years, a long term evolution (Long Term Evolution, LTE) standard proposed by the 3rd generation partnership project (3rd Generation Partnership Project, 3GPP) organization has been widely used worldwide. From a release (Release) 10, a carrier aggregation (Carrier Aggregation, CA) technology is introduced into the standard to aggregate a plurality of carriers to support wider transmission bandwidth, so that user equipment (User Equipment, UE) performs uplink transmission on at least two carriers. From a release 12, a dual connectivity (Dual Connectivity, DC) technology is introduced into the standard. The UE is configured to use radio resources provided by at least two different base stations. In other words, the UE performs uplink transmission on carriers of at least two cells.

When the UE performs the uplink transmission on the at least two carriers, a sum of transmit powers configured for the UE on a plurality of carriers may exceed a maximum power configured for the UE when the UE accesses a network. In this case, the UE may not meet a requirement of a transmit power configured on each carrier, and needs to adjust a transmit power on a carrier.

Currently, when the sum of the transmit powers configured for the UE on the plurality of carriers exceeds the maximum power configured for the UE when the UE accesses the network, a carrier power adjustment scheme of the UE is assigning a guaranteed power to each carrier, and assigning remaining powers in the following two manners: 1. The UE reduces, based on a service priority or a carrier priority, a transmit power in an entire slot on a carrier carrying a low-priority service or a carrier with a low priority, to ensure an enough transmit power on a carrier carrying a high-priority service or a carrier with a high priority. 2. The UE reduces a transmit power in an entire slot on a carrier on which a service is late transmitted, to ensure an enough transmit power on a carrier on which a service is early transmitted.

In 5th generation mobile communications technology (5th-Generation, 5G) new radio (New radio, NR), a plurality of parameter configurations (numerology) can be supported. Different numerologies include different subcarrier spacings and cyclic prefixes. Therefore, carriers supporting different numerologies correspond to different symbol lengths in time domain. In a scenario in which a plurality of carriers configured for UE support different numerologies, if a carrier is first scheduled to transmit a service, it is considered that no transmission on another carrier exists, and an enough power is assigned to the first scheduled carrier. in this case, if another carrier is suddenly scheduled to transmit a service with a high latency requirement, even if the another carrier has a high service priority or data on the another carrier is transmitted earlier than that on a previously scheduled carrier, the another carrier has been scheduled, and a power on the previously scheduled carrier cannot be reduced according to a current power adjustment scheme. Consequently, the suddenly scheduled carrier does not have an enough power, and therefore the suddenly scheduled carrier has poor transmission reliability.

Therefore, in a scenario in which a plurality of carriers configured for same UE support different numerologies, how to adjust a power on a carrier becomes an urgent problem to be resolved.

SUMMARY

Embodiments of this application provide a service transmission method, a device, and a system. In a scenario in which a plurality of carriers configured for same UE support different numerologies, a power on a carrier is adjusted, to ensure that a high-priority carrier has an enough transmit power.

To achieve the foregoing objective, the following technical solutions are used in the embodiments of this application.

According to a first aspect, a service transmission method is provided, and. is applied to UE. The method may specifically include: sending, by the UE, a first signal on a first symbol set on a first carrier by using a first transmit power; and sending, by the UE, a second signal on a second symbol set on a second carrier by using a second transmit power. A time resource on the first symbol set overlaps with a time resource on the second symbol set. The first transmit power is a transmit power configured or indicated by a first base station. The second transmit power is less than or equal to a transmit power configured or indicated by a second base station. The first signal includes at least one of a data signal, a control signal a reference signal, and an access signal. The second signal includes at least one of a data signal, a control signal, a reference signal, and an access signal.

According to the service transmission method provided in this embodiment of this application, when the UE communicates with a base station by using a plurality of carriers, based on a. power capability of the UE, at a symbol set location at which time resources overlap, signals are transmitted on some carriers by using a transmit power configured or indicated by the base station, and signals are transmitted on some other carriers by using a transmit power obtained by reducing the transmit power configured or indicated by the base station, so as to control a transmit power on each carrier based on a capability range of the UE at a symbol set location at which time resources of the plurality of carriers overlap. If the plurality of carriers used by the UE have different numerologies, when the UE transmits signals by using the plurality of carriers, according to the service transmission method provided in this application, the UE may control, at any time based on an actual service requirement, a transmit power at the symbol set location at which the time resources of the plurality of carriers overlap. This process is not limited by a scheduling moment of transmitting a service on a carrier. Therefore, in a scenario in which a plurality of carriers configured for same UE support different numerologies, a carrier power is adjusted, so as to ensure that a high-priority carrier has an enough transmit power.

I should be noted that the first base station may be the same as or different from the second base station. For example, when CA is configured for the UE, the first base station and the second base station are a same base station. When DC is configured for the UE, the first base station and the second base station are different base stations. A ratio of the transmit power obtained by reducing the transmit power configured or indicated by the base station to the transmit power configured or indicated by the base station may range from 0 to 1, so that the second transmit power is less than or equal to the transmit power configured or indicated by the second base station. A specific reduced amount may be determined based on an actual requirement and a maximum transmit power configured for the UE. This is not specifically limited in the solution of this application.

Further, before the UE sends the first signal on the first symbol set on the first carrier by using the first transmit power and the UE sends the second signal on the second symbol set on the second carrier by using the second transmit power, the UE receives scheduling signaling that is used by the first base station to schedule the UE to transmit a service on the first carrier, and receives scheduling signaling that is used by the second base station to schedule the UE to transmit a service on the second carrier.

With reference to the first aspect, in a possible implementation, a quantity of symbols included in the second symbol set may be less than or equal to a total quantity of symbols used for the second signal. When the quantity of symbols included in the second symbol set is less than the total quantity of symbols used for the second signal, the UE reduces transmit powers on some symbols on the second carrier to send the signal. When the quantity of symbols included in the second symbol set is equal to the total quantity of symbols used for the second signal, the UE reduces transmit powers on all symbols on the second carrier to send the signal. In a specific implementation process of the service transmission method provided in this embodiment of this application, locations of the first symbol set on the first carrier and the second symbol set on the second carrier may be determined based on an actual requirement. Specific locations of the first symbol set and the second symbol set are not limited in this embodiment of this application.

With reference to the first aspect or any possible implementation, in a possible implementation, that the second transmit power is less than or equal to the transmit power configured or indicated by the second base station may specifically include that the second transmit power is equal to a product of a power adjustment factor and the transmit power configured or indicated by the second base station, or the second transmit power is equal to 0. The power adjustment factor is greater than or equal to 0, and is less than or equal to 1. In this implementation, specific content that the second transmit power is less than or equal to the transmit power configured or indicated by the second base station is provided. The second transmit power may be adjusted by using the power adjustment factor, or may be directly set to 0 through puncturing. In actual application, a specific implementation may be selected based on an actual requirement.

With reference to the first aspect or any possible implementation, in a possible implementation, the power adjustment factor of the second transmit power may be one power adjustment factor in a preset power adjustment factor set of the UE. The preset power adjustment factor set of the UE includes at least one preset power adjustment factor used to adjust a transmit power of the UE. When the second transmit power is being determined, a proper power adjustment factor may be selected from the preset power adjustment factor set of the UE to obtain the second transmit power. A specific process of selecting the power adjustment factor may be implemented based on an actual requirement or the maximum transmit power configured for the UE.

With reference to the first aspect or any one of the foregoing possible implementations, in a possible implementation, after the UE sends the first signal on the first symbol set on the first carrier by using the first transmit power, and the UE sends the second signal on the second symbol set on the second carrier by using the second transmit power, the service transmission method provided in this application further includes: sending, by the UE, first indication information of the second transmit power to the second base station. In this way, after sending the second signal on the second symbol set on the second carrier by using the second transmit power, the UE notifies, by using the first indication information, the second base station of a change of the power of sending the second signal on the second symbol set on the second carrier by the UE, so that the base station adjusts the power after receiving the signal and then performs demodulation, thereby increasing demodulation accuracy of the base station.

With reference to the first aspect or any one of the foregoing possible implementations, in a possible implementation, the first indication information includes at least one of the following information: power information of the second transmit power and resource information of the second symbol set. The power information of the second transmit power includes at least one of the following information: an absolute value of the second transmit power, a value of the power adjustment factor of the second transmit power, and second indication information of the power adjustment factor of the second transmit power. The resource information of the second symbol set includes at least one of the following information used for the second symbol set: time information, frequency information, carrier information, space domain information, and codeword information. Specifically, the first indication information is used to notify the second base station of a transmit power change when the second transmit power used by the UE is compared with the transmit power configured or indicated by the second base station. The change includes a power change value and a power change location. In this case, if the power change location is known to both the base station and the UE, the first indication information may include only the power information of the second transmit power. If the power change value is known to both the base station and the UE, the first indication information may include only the resource information of the second symbol set. If the second base station does not know the power change value and the power change location, the first indication information may include the power information of the second transmit power and the resource information of the second symbol set. In this way, in different scenarios, the UE sends the second signal to the second base station on the second symbol set on the second carrier by using the second transmit power.

With reference to the first aspect or any one of the foregoing possible implementations, in a possible implementation, the first indication information may be used to indicate that the second transmit power is 0. In this way, content of the first indication information is implemented when the second transmit power is determined through puncturing.

With reference to the first aspect or any one of the foregoing possible implementations, in a possible implementation, before the sending, by the UE, first indication information of the second transmit power to the second base station, the service transmission method provided in this application may further include: receiving, by the UE, third indication information sent by a third base station. The third indication information is used to indicate a resource used by the UE to send the first indication information. The resource used to send the first indication information includes at least one of the following resources: a time resource, a frequency resource, a carrier resource, a space domain resource, and a codeword resource. The third base station may be the first base station or the second base station. Correspondingly, when the UE sends the first indication information based on scheduling of the base station, the sending, by the UE, first indication information of the second transmit power to the second base station may be specifically implemented as follows: sending, by the UE, the first indication information to the second base station by using the resource that is used by the UE to send the first indication information and that is indicated by the third indication information. In this implementation, the TIE sends the first indication information based on the scheduling of the base station. This matches a scheduling-before-execution mode in a communications system.

With reference to the first aspect or any one of the foregoing possible implementations, in a possible implementation, a time resource used by the UE to send the first indication information may be at a tail of data on the first carrier, or after data is transmitted on the first carrier, or after data is transmitted on the second carrier. In this implementation, a plurality of available locations of the time resource used by the UE to send the first indication information are provided, and can be flexibly used. in actual application. It should be noted that, because the UE sends the first indication information to the second base station, a carrier on which the resource used by the UE to send the first indication information is located is a carrier on which the UE communicates with the second base station.

With reference to the first aspect or any one of the foregoing possible implementations, in a possible implementation, the first carrier is a carrier with a highest power adjustment priority in the first carrier and the second carrier used by the UE. The UE sends the first signal on the first symbol set on the first carrier by using the first transmit power configured or indicated by the first base station. This process is limited by the maximum transmit power configured for the UE. The UE sends the second signal on the second symbol set on the second carrier by using the second transmit power that is less than or equal to the transmit power configured or indicated by the second base station. A carrier on which a high-priority service is transmitted. has a high power adjustment priority, or a carrier whose power adjustment location includes a carrier demodulation reference signal has a high power adjustment priority, or a carrier on which data is transmitted early has a high power adjustment priority, or a carrier on which a signal that includes data or control signaling is transmitted has a higher power adjustment priority than a carrier on which a signal that does not include data or control signaling is transmitted. This implementation provides a manner of selecting a priority of a carrier when the UE controls a power on the carrier during transmitting a service by using a plurality of carriers.

Optionally, the signal that does not include the data or the control signaling may include a sounding reference signal (Sounding Reference Signal, SRS) signal or a physical random access channel (Physical Random Access Channel, TRACH) signal.

With reference to the first aspect or any one of the foregoing possible implementations, in a possible implementation, the first symbol set includes a symbol to which an overlapping part between a time resource on the first carrier and a time resource on the second carrier belongs on the first carrier. The second symbol set includes a symbol to which the overlapping part between the time resource on the first carrier and the time resource on the second carrier belongs on the second carrier.

With reference to the first aspect or any one of the foregoing possible implementations, in a possible implementation, the first symbol set is the symbol to which the overlapping part between the time resource on the first carrier and the time resource on the second carrier belongs on the first carrier, and the second symbol set is the symbol to which the overlapping part between the time resource on the first carrier and the time resource on the second carrier belongs on the second carrier.

According to a second aspect, a service transmission method is provided, and is applied to a second base station. The method may specifically include: receiving, by the second base station, first indication information sent by UE, where the UE sends a signal on a first symbol set on a first carrier by using a first transmit power, the UE sends a signal on a second symbol set on a second carrier by using a second transmit power, a time resource on the first symbol set overlaps with a time resource on the second symbol set, the first transmit power is a transmit power configured or indicated by a first base station, and the second transmit power is less than or equal to a transmit power configured or indicated by a second base station, and demodulating, by the second base station based on the first indication information, the signal received on the second symbol set on the second carrier, where the signal received on the second symbol set includes at least one of the following signals: a data signal, a control signal, a reference signal, and an access signal.

According to the service transmission method provided in this embodiment of this application, after the UE controls a transmit power on each carrier based on a capability range of the UE at a symbol set location at which time resources of a plurality of carriers overlap, the base station demodulates the received signal based on an indication of the UE. If the transmit power configured or indicated by the second base station is reduced when the UE controls a transmit power on a carrier, after receiving the signal, the second base station may adjust the power based on the first indication information and then perform demodulation, thereby improving demodulation accuracy of the base station.

With reference to the second aspect, in a possible implementation, the first indication information includes power information of a transmit power on the second carrier and/or resource information of the second symbol set on the second carrier. The demodulating, by the second base station based on the first indication information, the signal received on the second symbol set on the second carrier may be specifically implemented as follows: performing, by the second base station based on the power information of the transmit power, power compensation on the signal received on the second symbol set on the second carrier, and then performing demodulation. A compensation power herein is determined based on a value of the second transmit power. A value of the compensation power is greater than or equal to a difference value between the second transmit power and the transmit power configured or indicated by the second base station.

The power information of the second transmit power includes at least one of the following information: an absolute value of the second transmit power, a value of a power adjustment factor of the second transmit power, and second indication information of the power adjustment factor of the second transmit power. The resource information of the second symbol set includes at least one of the following information used for the second symbol set: time information, frequency information, carrier information, space domain information, and codeword information, Specifically, the first indication information is used to notify the second base station of a transmit power change when the second transmit power used by the UE is compared with the transmit power configured or indicated by the second base station. The change includes a power change value and a power change location. In this case, if the power change location is known to both the base station and the UE, the first indication information may include only the power information of the second transmit power. If the power change value is known to both the base station and the UE, the first indication information may include only the resource information of the second symbol set. If the second base station does not know the power change value and the power change location, the first indication information may include the power information of the second transmit power and the resource information of the second symbol set. In this way, in different scenarios, the UE sends the second signal to the second base station on the second symbol set on the second carrier by using the second transmit power.

With reference to the second aspect or any possible implementation, in a possible implementation, if the second symbol set includes a demodulation reference signal of the second carrier, after the performing, by the second base station based on the power information of the transmit power, power compensation on the signal received on the second symbol set on the second carrier, and then performing demodulation, the service transmission method provided in this application further includes: demodulating, by the second base station based on a demodulation reference signal obtained after the power compensation, another signal on the second carrier except the second symbol set. In this way, when a power of the demodulation reference signal is reduced, the second base station demodulates the received signal based on the demodulation reference signal obtained after the power compensation, thereby increasing demodulation accuracy of the second base station.

With reference to the second aspect or any possible implementation, in a possible implementation, that the second transmit power is less than or equal to the transmit power configured or indicated by the second base station may specifically include that the second transmit power is equal to a product of a power adjustment factor and the transmit power configured or indicated by the second base station, or the second transmit power is equal to 0. The power adjustment factor is greater than or equal to 0, and is less than or equal to 1. In this implementation, specific content that the second transmit power is less than or equal to the transmit power configured or indicated by the second base station is provided. The second transmit power may be adjusted by using the power adjustment factor, or may be directly set to 0 through puncturing. In actual application, a specific implementation may be selected based on an actual requirement.

It should be noted that the power adjustment factor is described in detail in the foregoing first aspect, and is not described herein.

With reference to the second aspect or any one of the foregoing possible implementations, in a possible implementation, the first indication information may be used to indicate that the second transmit power is 0. In this way, content of the first indication information is implemented when the second transmit power is determined. through puncturing, With reference to the second aspect or any one of the foregoing possible implementations, in a possible implementation, if the first indication information indicates that the second transmit power is 0, the demodulating, by the second base station based on the first indication information, the signal received on the second symbol set on the second carrier may be specifically implemented as follows: using, as a prior signal by the second base station, the signal received on the second symbol set on the second carrier, and demodulating the signal received on the second symbol set on the second carrier; or directly demodulating, by the second base station, the signal received on the second symbol set on the second carrier; or skipping, by the second base station, the signal received on the second symbol set on the second carrier. in this implementation, a possible implementation of processing the received signal by the second base station when the second transmit power is 0 is provided, to improve flexibility of the solution. A specific implementation may be selected based on an actual requirement. This is not specifically limited. in this application.

With reference to the second aspect or any one of the foregoing possible implementations, in a possible implementation, if the first indication information indicates that the second transmit power is 0, the demodulating, by the second base station based on the first indication information, the signal received on the second symbol set on the second carrier may be specifically implemented as follows: using, as a prior signal by the second base station, the signal received on the second symbol set on the second carrier, and demodulating the signal received on the second symbol set on the second carrier. Further, after the demodulating, by the second base station based on the first indication information, the signal received on the second symbol set on the second carrier, the service transmission method provided in this application may further include: demodulating, by the second base station by using the prior signal, a signal received at a location on the second carrier except the second symbol set. In this way, a possible implementation of processing the received signal by the second base station when the second transmit power is 0 is provided, to improve flexibility of the solution, With reference to the second aspect or any one of the foregoing possible implementations, in a possible implementation, before the receiving, by a second base station, first indication information sent by UE, the service transmission method provided in this application may further include: sending, by the second base station, third indication information to the UE. The third indication information is used to indicate a resource used by the UE to send the first indication information. The resource used by the UE to send the first indication information includes at least one of the following resources: a time resource, a frequency resource, a carrier resource, a space domain resource, and a codeword resource. Correspondingly, the receiving, by a second base station, first indication information sent by UE may be specifically implemented as follows: receiving, by the second base station by using the resource that is used by the UE to send the first indication information and that is indicated by the third indication information, the first indication information sent by the UE, In this implementation, the UE sends the first indication information based on the scheduling of the second base station. This matches a scheduling-before-execution mode in a communications system.

With reference to the second aspect or any one of the foregoing possible implementations, in a possible implementation, a time resource used by the UE to send the first indication information may be at a tail of data on the first carrier, or after data is transmitted on the first carrier, or after data is transmitted on the second carrier. In this implementation, a plurality of available locations of the time resource used by the UE to send the first indication information are provided, and can be flexibly used in actual application. It should be noted that, because the UE sends the first indication information to the second base station, a carrier on which the resource used by the UE to send the first indication information is located is a carrier on which the UE communicates with the second base station.

It should be noted that specific implementation of the service transmission method that is performed by the second base station and that is provided in the second aspect is the same as that of the service transmission method that is performed by the UE and that is provided in the first aspect. Refer to specific implementation of the first aspect. Details are not described herein.

According to a third aspect, an embodiment of this application provides UE. The UE includes a sending unit, configured to: send a first signal on a first symbol set on a first carrier by using a first transmit power, and send a second signal on a second symbol set on a second carrier by using a second transmit power. A time resource on the first symbol set overlaps with a time resource on the second symbol set. The first transmit power is a transmit power configured or indicated by a first base station. The second transmit power is less than or equal to a transmit power configured or indicated by a second base station. The first symbol includes at least one of a data signal, a control signal, a reference signal, and an access signal. The second signal includes at least one of a data signal, a control signal, a reference signal, and an access signal.

It should be noted that the UE provided in the third aspect is configured to perform the service transmission method provided in the foregoing first aspect. For specific implementation of the UE, refer to specific implementation of the first aspect. Details are not described herein.

According to a fourth aspect, an embodiment of this application provides a second base station. The second base station includes: a receiving unit, configured to: receive first indication information sent by UE, where the UE sends a signal on a first symbol set on a first carrier by using a first transmit power, the UE sends a signal on a second symbol set on a second carrier by using a second transmit power, a time resource on the first symbol set overlaps with a time resource on the second symbol set, the first transmit power is a transmit power configured or indicated by a first base station, and the second transmit power is less than or equal to a transmit power configured or indicated by a second base station; and a demodulation unit, configured to demodulate, based on the first indication information received by the receiving unit, the signal received on the second symbol set on the second carrier, where the signal received on the second symbol set includes at least one of the following signals: a data signal, a control signal, a reference signal, and an access signal.

It should be noted that the second base station provided in the fourth aspect is configured to perform the service transmission method provided in the foregoing second aspect. For specific implementation of the second base station, refer to specific implementation of the second aspect. Details are not described herein.

According to a fifth aspect, an embodiment of this application provides UE, The UE may implement functions of the UE in the method examples. The functions may be implemented by hardware, or may be implemented by hardware by executing corresponding software. The hardware or the software includes one or more modules corresponding to the foregoing functions.

With reference to the fifth aspect, in a possible implementation, a structure of the UE includes a processor and a transceiver. The processor is configured to support the UE in performing the corresponding functions in the method, The transceiver is configured to support the UE in communicating with another device. The UE may further include a memory. The memory is configured to be coupled to the processor, and the memory stores a program instruction and data necessary to the UE.

According to a sixth aspect, an embodiment of this application provides a base station. The base station may implement functions of the terminal in the method examples. The functions may be implemented by hardware, or may be implemented by hardware by executing corresponding software. The hardware or the software includes one or more modules corresponding to the foregoing functions.

With reference to the sixth aspect, in a possible implementation, a structure of the base station includes a processor and a transceiver. The processor is configured to support the base station in performing the corresponding functions in the foregoing method. The transceiver is configured to support the base station in communicating with another device. The base station may further include a memory. The memory is configured to be coupled to the processor, and the memory stores a program instruction and data that are necessary for the base station.

According to a seventh aspect, an embodiment of this application provides a computer storage medium, configured to store a computer software instruction used by the foregoing UE. The computer software instruction includes a program designed for executing the first aspect.

According to an eighth aspect, an embodiment of this application provides a computer storage medium, configured to store a computer software instruction used by the second base station. The computer software instruction includes a program designed for executing the second aspect.

According to a ninth aspect, an embodiment of this application provides a communications system. The communications system includes the UE described in any aspect or any possible implementation in the foregoing.

With reference to the ninth aspect, in a possible implementation, the communications system may further include the second base station described in any aspect or any possible implementation in the foregoing.

The solutions provided in the third aspect and the ninth aspect are used to implement the service transmission method provided in the first aspect or the second aspect, achieving a beneficial effect the same as that of the first aspect or the second aspect. Details are not described herein.

DESCRIPTION OF EMBODIMENTS

Currently, a scenario in which a plurality of carriers are configured for same UE to communicate with a base station is very common. However, due to a characteristic of a service transmission on each carrier, different requirements are imposed on a transmit power configured for UE on each carrier. However, a total transmit power configured for the UE is further limited by a maximum power configured for the UE when the UE accesses a network. Therefore, when the plurality of carriers are configured for the UE, the transmit power configured for the UE on each carrier needs to be adjusted, and a service requirement and a requirement that the total transmit power configured for the UE on all carriers is less than or equal to the maximum power configured for the UE are both met. In long term evolution (Long Term Evolution, LTE), a power control manner used when CA is configured is different from a power control manner used when DC is configured.

For example, when the CA is configured for the UE, and a sum of transmit powers configured for the UE on the plurality of carriers exceeds the maximum power Pmax configured for the UE, the UE reduces a transmit power of all data transmission on at least one carrier (possibly to 0). Because a same scheduler is used for the carriers under the CA, a base station may perform power control through scheduling.

For another example, when the DC is configured for the UE, and a sum of transmit powers configured for the UE on the plurality of carriers exceeds the maximum power Pmax configured for the UE, a guarantee power is configured for each carrier, so as to ensure that a carrier has an enough transmit power in different power control modes during data transmission. Currently, there are two power control modes (Power Control Mode, PCM):

In a PCM 1, a guarantee power is assigned to each carrier, and an additional power is assigned based on a service priority or a carrier priority (communication with a primary cell group or communication with a secondary cell group), so that an enough power is assigned to a high-priority carrier.

In a PCM 2, a guarantee power is assigned to each carrier, and an additional power is assigned to a carrier to which a first received service belongs.

In the LIE, a specific time interval exists between scheduling of uplink transmission and the uplink transmission. Therefore, the power control manner is effective.

Figure 1:
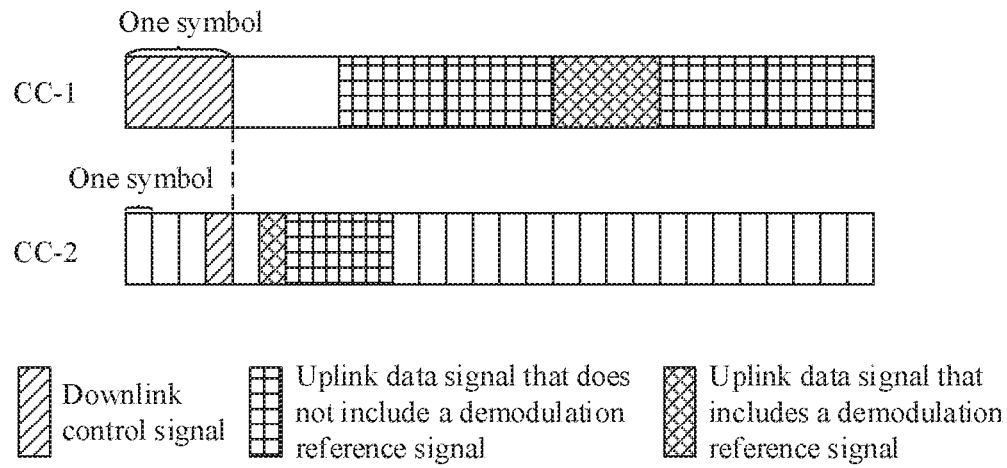
FIG. 1 is a time-domain structural diagram in which different numerologies are configured for different carriers according to the prior art.

However, in 5G NR, when different numerologies are configured for different carriers, the power control method in the LTE is no longer applicable. FIG 1 is a schematic time-domain structural diagram in which different numerologies are configured for different carriers. As shown in FIG. 1, two carriers are configured for the UE and denoted as CC-1 and CC-2, and the UE works in a DC mode. A subcarrier spacing of CC-2 is four times a subcarrier spacing of CC-1. In this case, a symbol length of CC-1 is four times a symbol length of CC-2. A service with a low-latency requirement is transmitted on CC-1. After uplink transmission on CC-1 is scheduled, a service with a higher-latency requirement appears on CC-2. If the maximum power Pmax of the UE is insufficient to provide two transmissions with enough powers, assignment of powers for the two transmissions requires a balance. If the power adjustment method used in the LTE when the CA is configured is used, scheduling times on the two carriers are different. When scheduling the transmission on CC-1, the base station does not know that the service suddenly occurs on CC-2 during the service transmission on CC-1. Therefore, an enough transmit power has been assigned for the transmission on CC-1 during scheduling the transmission on CC-1, and a remaining power during scheduling CC-2 may be insufficient for the transmission on CC-2. Therefore, the base station cannot perform power control through scheduling. If processing is performed based on a PCM 1 in the LIE, an enough power should be assigned for the transmission on CC-2 due to a higher service priority of the transmission. However, during scheduling a service on CC-2, an enough transmission power has been scheduled and assigned for the transmission on CC-1. When receiving scheduling signaling for CC-1, the UE does not know that the service suddenly occurs on CC-2 in a process of the service transmission on CC-1. Therefore, the service has been transmitted based on the scheduled transmit power on CC-1, and a remaining power may be insufficient for the transmission on CC-2. If processing is performed based on a PCM 2 in the LTE, even if uplink transmission on CC-2 actually starts earlier than uplink transmission on CC-1, and an enough power should be assigned for the uplink transmission on CC-2 in preference, during scheduling the service on CC-2, an enough transmit power has been scheduled and assigned for the transmission on CC-1. When receiving scheduling signaling for CC-1, the UE does not know that the service suddenly occurs on CC-2 in a process of the service transmission on CC-1. Therefore, the service is transmitted by using the scheduled transmit power, and a remaining power may be insufficient for the transmission on CC-2. Therefore, for carriers supporting different numerologies, time-domain symbol lengths on the carriers are also different. Consequently, all existing solutions for adjusting a transmit power of the UE on a carrier are inapplicable due to differences in a scheduling time, a data transmission start time, and the like.

Based on this, this application provides a new service transmission method for adjusting a power on a carrier when a plurality of carriers configured for the UE support different numerologies. A basic principle of the method is as follows: When the UE transmits services by using a plurality of carriers, a signal is sent at a power adjustment location on one carrier by using a transmit power configured or indicated by the station, and a. signal is transmitted at a power adjustment location on a remaining carrier by using a transmit power less than or equal to the transmit power configured or indicated by the station. Time resources at power adjustment locations of different carriers overlap. Only a power adjustment location is adjusted in this application. The power adjustment location may be flexibly configured based on an actual requirement, and a power for a scheduled service may also be reduced to ensure that a temporary burst service has an enough transmit power.

The base station described in this application is a network side device that provides a communication service for UE in a wireless communications system. In wireless communications systems of different standards, the base station may have different names. Base stations under these different names all may be understood as the base station described in this application. A type of the base station is not specifically limited in this embodiment of this application. For example, a base station in a universal mobile telecommunications system (Universal Mobile Telecommunications System, UMTS) is referred to as a base station (Base Station, BS), and a base station in an LIE system is referred to as an evolved NodeB (evolved. Node B, eNB). No further examples are listed one by one herein. Any network side device providing a communication service for the UE in the wireless communications system may be understood as the base station described in this application.

The UE described in this application is a mobile communications device used by a user. The UE may be a mobile phone, a tablet computer, a notebook computer, an ultra-mobile personal computer (Ultra-mobile Personal Computer, UMPC), a netbook, a personal digital assistant (Personal Digital Assistant, PDA), an ebook, a mobile television, a wearable device, a personal computer (Personal Computer, PC), or the like. In communications systems of different standards, a terminal may have different names. Terminals under different names may be understood as the UE described in this application. A type of the UE is not specifically limited in this embodiment of this application.

Figure 2:
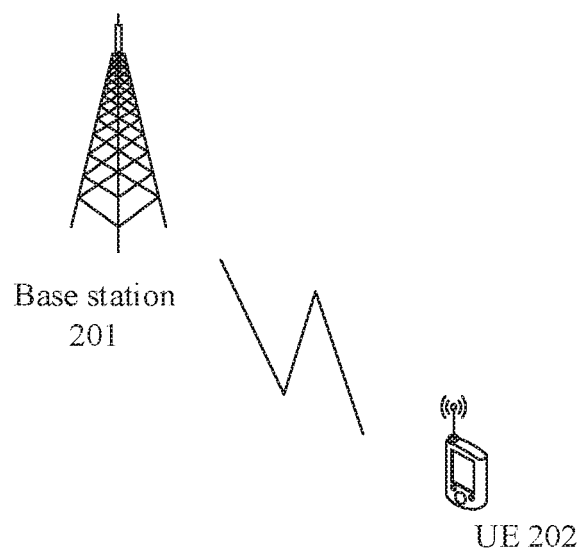
FIG. 2 is a schematic diagram of a wireless communications system architecture according to the prior art.

A service transmission method provided in this application is applied to a wireless communications system architecture shown in FIG. 2. As shown in FIG. 2, the wireless communications system architecture includes at least one base station 201 and UE 202 that communicates with the base station 201.

It should be noted that FIG. 2 is merely a schematic diagram of the wireless communications system architecture by using an example. In the wireless communications system architecture, a quantity of base stations 201, a type of a base station 201, a quantity of UEs 202, a type of UE 202, and the like may be all configured based on actual requirements. The content is not specifically limited in FIG 2.

It should be further noted that the UE 202 in FIG. 2 may communicate with at least one base station 201 by using at least two carriers. For example, UE 202 configured with the CA may communicate with one base station 201 by using at least two carriers, and UE 202 configured with the DC may communicate with at least two base stations 101 by using at least two carriers.

The wireless communications system architecture shown in FIG. 2 may be an LTE network, a universal mobile telecommunications system (Universal Mobile Telecommunications System, UMTS) network, or another network, A type of a network to which a solution of this application is applied is not specifically limited in the embodiments of this application.

Before the embodiments of this application are described, terms used in the embodiments of this application are explained herein.

A data signal is a signal that carries service data content and that is transmitted in a communication process between UE and a base station. For example, the data signal may be a signal that carries service data content in an uplink signal sent by the UE to the base station. A type of the service data content in the data signal is not specifically limited in this application.

A control signal is a signal that carries a control instruction and that is transmitted in the communication process between the UE and the base station. For example, the control signal may be a signal to which downlink control signaling belongs and that is sent by the base station to the UE. A type of the control instruction in the control signal is not specifically limited in this application.

A reference signal is a signal that carries information used for reference and known to both parties and that is transmitted in the communication process between the UE and the base station. For example, the control signal may be a demodulation reference signal or an SRS. A type of the reference signal is not specifically limited in this application.

An access signal is a signal that is transmitted in the process of communication between the UE and the base station and that is used by the UE to access a network provided by the base station. For example, the access signal may be a TRACH signal. A type of the access signal is not specifically limited in this application.

In a communications system, a communication resource used to transmit a signal is in a plurality of dimensions that include a time dimension (or referred to as a time domain dimension), a frequency dimension, a carrier dimension, a space dimension (or referred to as a space domain dimension), and a code domain dimension. A location used by the communication resource in each dimension may be represented by using information to reflect a specific location of the communication resource in multidimensional transmission. Information used to represent locations of the communication resource in the time dimension, the frequency dimension, the carrier dimension, the space dimension, and the code domain dimension is respectively referred to as time information, frequency information, carrier information, space domain information, and codeword information. A representation form of each type of dimension information is not specifically limited in this embodiment of this application, and may be set based on an actual requirement.

As described above, in the communications system, the communication resource used to transmit the signal is in a plurality of dimensions that include the time dimension (or referred to as the time domain dimension), the frequency dimension, the carrier dimension, the space dimension (or referred to as the space domain dimension), and the code domain dimension. An allocated resource used for transmitting a signal may also be subdivided into resources in a plurality of dimensions for description. Therefore, a communication resource may be subdivided into resources in a time dimension, a frequency dimension, a carrier dimension, a space dimension, and a code domain dimension, and these resources are referred to as a time resource, a frequency resource, a carrier resource, a space domain resource, and a codeword resource.

In the specification and claims in the embodiments of this application, the terms "first", "second", and the like are intended to distinguish between different objects but do not indicate a particular order of the objects. For example, a first base station, a second base station, and the like are intended to distinguish between different base stations, instead of describing a particular order of devices.

In addition, in the embodiments of this application, the term "for example", "such as", or the like is used to represent giving an example, an illustration, or a description. Any embodiment or design scheme described as "for example" or "such as" in the embodiments of this application should not be explained as being more preferred or having more advantages than another embodiment or design scheme. Specifically, use of the term "for example", "such as", or the like is intended to present a concept in a specific manner for ease of understanding.

The following describes in detail the embodiments of this application with reference to accompanying drawings.

Figure 3:
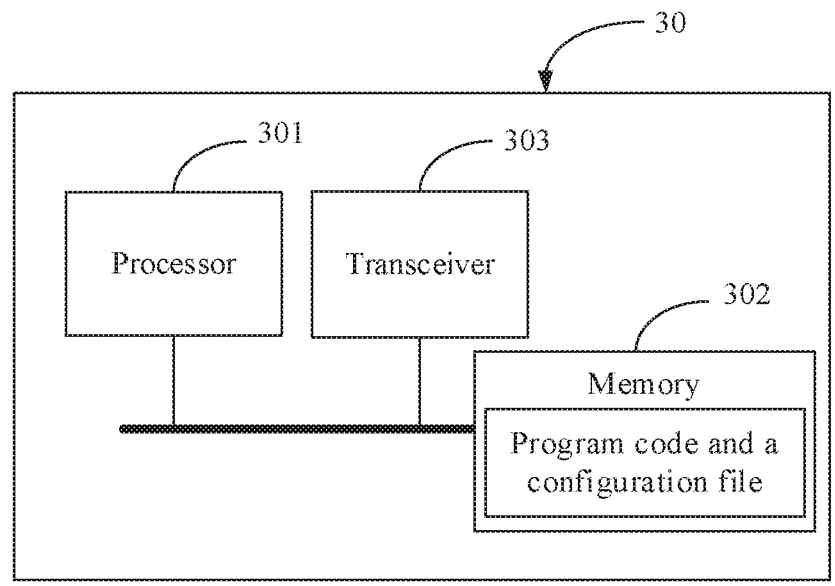
FIG. 3 is a schematic structural diagram of UE according to an embodiment of this application.

According to one aspect, an embodiment of this application provides UE. FIG. 3 shows UE 30 related to the embodiments of this application. The UE 30 may be the UE 302 in the wireless communications system architecture shown in FIG. 2. As shown in FIG. 3, the UE 30 may include a processor 301, a memory 302, and a transceiver 303.

The following describes each component of the UE 30 in detail with reference to FIG. 3.

The memory 302 may be a volatile memory (volatile memory), for example, a random access memory (random-access memory, RAM); or a nonvolatile memory (non-volatile memory), for example, a read-only memory (read-only memory, ROM), a flash memory (flash memory), a hard disk (hard disk drive. HDD), or a solid. state drive (solid-state drive, SSD); or a combination of the foregoing types of memories. The memory 302 is configured to store program code and a configuration file that can be used to implement a method in this application.

As a control center of the UE 30, the processor 301 may be a central processing unit (central processing unit, CPU), or may be an application-specific integrated circuit (Application Specific Integrated Circuit, ASIC), or one or more integrated circuits configured to implement the embodiments of this application, such as one or more microprocessors (digital signal processor, DSP), or one or more field programmable gate arrays (Field Programmable Gate Array, FPGA). The processor 301 may perform various functions of the UE 30 by running or executing a software program and/or a module stored in the memory 302 and invoking data stored in the memory 302.

The transceiver 303 is used by the UE 30 to interact with another unit. For example, the transceiver 303 may be a transceiver antenna of the UE 30.

Specifically, the processor 201 performs the following functions by running or executing the software program and/or the module stored in the memory 302 and invoking the data stored in the memory 302:

The transceiver 303 sends a first signal on a first symbol set on a first carrier by using a first transmit power, and the transceiver 303 sends a second signal on a second symbol set on a second carrier by using a second transmit power. A time resource on the first symbol set overlaps with a time resource on the second symbol set. The first transmit power is a transmit power configured or indicated by a first base station. The second transmit power is less than or equal to a transmit power configured or indicated by a second base station. The first symbol includes at least one of a data signal, a control signal, a reference signal, and an access signal. The second signal includes at least one of a data signal, a control signal, a reference signal, and an access signal.

Figure 4:
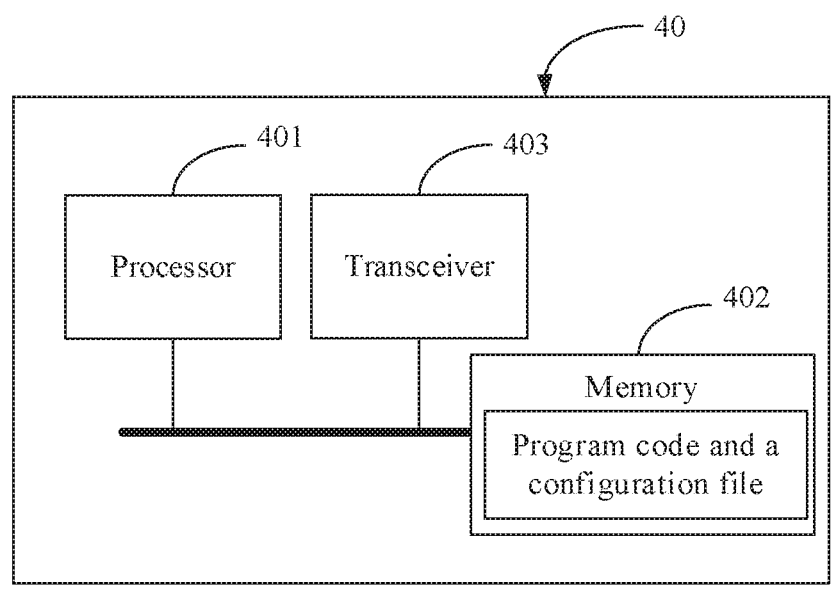
FIG. 4 is a schematic structural diagram of a base station according to an embodiment of this application.

According to another aspect, an embodiment of this application provides a base station. FIG. 4 shows a base station 40 related to the embodiments of this application. The base station 40 may be the base station 201 in the wireless communications system architecture shown in FIG. 2. As shown in FIG. 4, the base station 40 may include a processor 401, a memory 402, and a transceiver 403.

The following describes each component of the base station 40 in detail with reference to FIG. 4.

The memory 402 may be a volatile memory, for example, a RAM; or a nonvolatile memory, for example, a ROM, a flash memory, an HDD, or an SSD; or a combination of the foregoing types of memories. The memory 402 is configured to store program code and a configuration file that can be used to implement a method in this application.

As a control center of the base station 40, the processor 401 may be a CPU, an ASIC, or one or more integrated circuits configured to implement the embodiments of this application, such as one or more DSPs or one or more FPGAs. The processor 401 may perform various functions of the base station 40 by running or executing a software program and/or a module stored in the memory 402 and invoking data stored in the memory 402.

The transceiver 403 is used by the base station 40 to interact with another unit. For example, the transceiver 403 may be a transceiver antenna of the base station 40.

Specifically, the processor 401 performs the following functions by running or executing the software program and/or the module stored in the memory 402 and invoking the data stored in the memory 402:

The transceiver 403 receives first indication information sent by UE. The UE sends a signal on a first symbol set on a first carrier by using a first transmit power, and the UE sends a signal on a second symbol set on a second carrier by using a second transmit power. A time resource on the first symbol set overlaps with a time resource on the second symbol set. The first transmit power is a transmit power configured or indicated by a first base station. The second transmit power is less than or equal to a transmit power configured or indicated by a second base station. The processor 401 demodulates, based on the first indication information, the signal received on the second symbol set on the second carrier. The signal received on the second symbol set includes at least one of the following signals: a data signal, a control signal, a reference signal, and an access signal.

Figure 5:
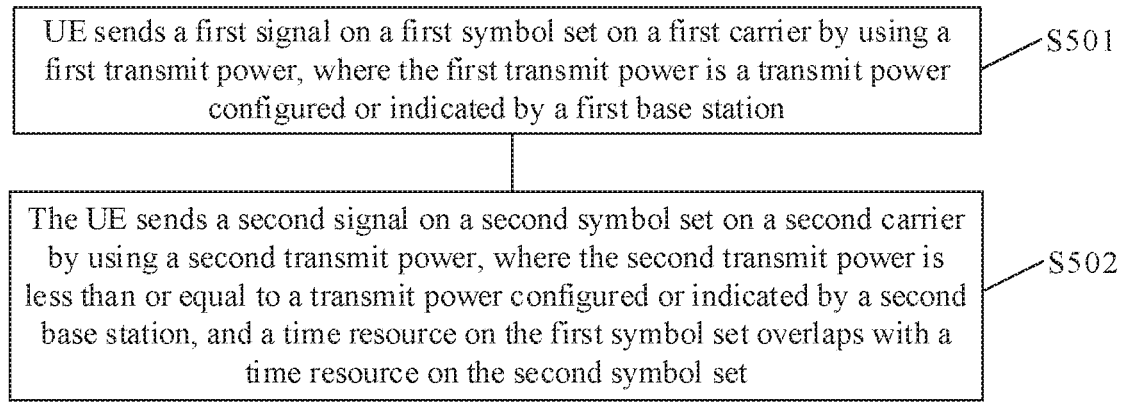
FIG. 5 is a schematic flowchart of a service transmission method according to an embodiment of this application.

According to still another aspect, an embodiment of this application provides a service transmission method. The method is applied to UE. As shown in FIG. 5, the method may include the following steps:

S501. UE sends a first signal on a first symbol set on a first carrier by using a first transmit power, where the first transmit power is a transmit power configured or indicated by a first base station.

S502. The UE sends a second signal on a second symbol set on a second carrier by using a second transmit power, where the second transmit power is less than or equal to a transmit power configured or indicated by a second base station, and a time resource on the first symbol set overlaps with a time resource on the second symbol set.

The first signal includes at least one of a data signal, a control signal, a reference signal, and an access signal. The second signal includes at least one of a data signal, a control signal, a reference signal, and an access signal.

Specifically, before S501, the UE receives scheduling signaling that is sent by the first base station and that is for transmitting a first service on the first carrier. In the scheduling signaling, a transmit power of transmitting the first service by the UE is configured or indicated as the first transmit power. The first signal is a signal for transmitting the first service, and may be at least one of a data signal, a control signal, a reference signal, or an access signal of the first service. Before S502, the UE receives scheduling signaling that is sent by the second base station and that is for transmitting a second service on the second carrier. In the scheduling information, a transmit power of transmitting the second service by the UE is configured or indicated. The second signal is a signal for transmitting the second service, and may be at least one of a data signal, a control signal, a reference signal, or an access signal of the second service. The second transmit power is less than or equal to the transmit power that is of transmitting the second service by the UE and that is configured or indicated by the second base station.

It should be noted that, for a process in which the base station sends the scheduling signaling for transmitting a service, details are not described in this embodiment of this application.

Optionally, a quantity of symbols in the first symbol set is less than or equal to a total quantity of symbols used for the first signal on the first carrier. The first symbol set may include at least one of the symbols used for the first signal on the first carrier.

Optionally, a quantity of symbols in the second symbol set is less than or equal to a total quantity of symbols used for the second signal on the second carrier. The second symbol set may include at least one of the symbols used for the second signal on the second carrier.

Optionally, the first symbol set and the second symbol set include an overlapping part between a time resource of the first signal and a time resource of the second signal. It should be noted that because communication resources are scheduled based on symbols, the overlapping part of time resources is a symbol to which the overlapping part of the time resources belongs on each carrier.

Figure 6:
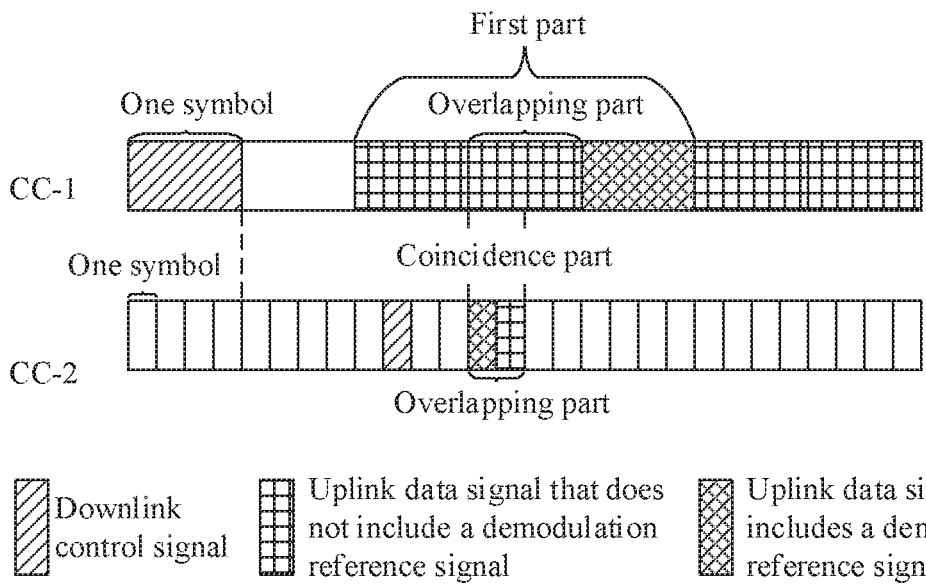
FIG. 6 is a schematic diagram of carrier time-domain content according to an embodiment of this application.

For example, FIG. 6 is a schematic time-domain structural diagram in which different numerologies are configured for two carriers. As shown in FIG. 6, two carriers are configured for the UE and denoted as CC-1 and CC-2. A subcarrier spacing of CC-2 is four times a subcarrier spacing of CC-1. In this case, a symbol length of CC-1 is four times a symbol length of CC-2. The two carriers are respectively represented as a first carrier and a second carrier. An overlapping part of time domain resources on the two carriers is indicated in FIG. 6, that is, a symbol to which a coincidence part of time domain resources on the two carriers belongs.

Further, referring to the schematic diagram of FIG. 6, a first symbol set on the first carrier may include an overlapping part on the first carrier shown in FIG. 6. Therefore, the first symbol set on the first carrier may be only the overlapping part of the time domain resources, or the first symbol set on the first carrier may be a first part shown in FIG. 6 (the first part shown in FIG. 6 is merely an example, and is not intended to limit a quantity of symbols included in the part) obtained through extension of the overlapping part of the time domain resources. Likewise, referring to the schematic diagram of FIG. 6, the second symbol set on the second carrier may include an overlapping part on the second carrier shown in FIG. 6, or the second symbol set on the second carrier may be only the overlapping part of the time domain resources.

It should be noted that S501 and S502 may be simultaneously performed, or may be successively performed. This depends on scheduling of services transmitted on the first carrier and the second carrier. Details are not specifically limited in this embodiment of this application. The connection sequence shown in S501 and S502 in FIG. 5 is not intended to limit a sequence of performing S501 and S502.

It should be further noted that scheduling signaling that the UE performs S501 and scheduling signaling that the UE performs S502 may be simultaneously scheduled; or one of the scheduling signaling for performing S501 and the scheduling signaling for performing S502 may be scheduled first, and the other may be suddenly scheduled. This is not specifically limited in this embodiment of this application, Optionally, the first base station and the second base station may be a same base station or different base stations. This is not specifically limited in this embodiment of this application. For example, CA may be configured for the UE, so that the UE sends signals to a same base station by using the first carrier and the second carrier. In this case, the first base station and the second base station are the same base station. For example, DC may be configured for the UE, so that the UE sends signals to different base stations by using the first carrier and the second carrier. In this case, the first base station and the second base station are different base stations.

Specifically, when the UE transmits services by using two carriers, if a sum of the transmit power configured or indicated by the first base station and the transmit power configured or indicated by the second base station is less than or equal to a maximum transmit power configured for the UE when the UE accesses a network, the second transmit power is equal to the transmit power configured or indicated by the second base station, If a sum of the transmit power configured or indicated by the first base station and the transmit power configured or indicated by the second base station is greater than a maximum transmit power configured for the UE when the UE accesses a network, the second transmit power is less than the transmit power configured or indicated by the second base station.

Specifically, that the second transmit power is less than or equal to the transmit power configured or indicated by the second base station may be specifically implemented in the following two manners:

Manner 1: The second transmit power is equal to a product of a power adjustment factor and the transmit power configured or indicated by the second base station.

Herein, the power adjustment factor is greater than or equal to 0, and is less than or equal to 1.

Manner 2: The second transmit power is equal to 0.

For example, in manner 2, the second transmit power may be set to 0 through puncturing, Certainly, the second transmit power may be set to 0 in another manner This is not specifically limited in this embodiment of this application.

Optionally, the power adjustment factor of the second transmit power may be calculated by dividing the second transmit power by the transmit power configured or indicated by the second base station.

Optionally, the power adjustment factor of the second transmit power may be selected from a preset power adjustment factor set of the UE. The preset power adjustment factor set of the UE includes at least one power adjustment factor used to adjust a transmit power. When a range of the second transmit power is determined, a proper power adjustment factor may be selected as the power adjustment factor of the second transmit power from the preset power adjustment factor set of the UE, and a specific value of the second transmit power is obtained.

It should be noted that both a quantity of power adjustment factors and a value of the power adjustment factor included in the preset power adjustment factor set of the UE may be determined based on an actual requirement. Details are not specifically limited in this embodiment of this application.

For example, it is assumed that the transmit power configured or indicated by the second base station is 3 watts (Watt, W). The first transmit power is 3 W, and the maximum transmit power configured for the UE is 4 W In this case, it is determined that the second transmit power needs to be less than or equal to 1 W. It is assumed that the preset power adjustment factor set of the UE is [0, 0.1, 0.3, 0.4, 0.6, 0.7, 0.9, 1]. The power adjustment factor 0.3 in the set is selected as the power adjustment factor of the second transmit power, and a specific value of the second transmit power is determined to be 0.9 W.

Further, S501 and S502 describe a result of controlling a transmit power on each carrier when the UE sends signals for service transmission by using the two carriers. When the UE sends the signals for the service transmission by using the two carriers, determining a carrier on which the transmit power configured or indicated by the base station is to be used and a carrier on which a transmit power less than or equal to the transmit power configured or indicated by the base station is to be used may be specifically implemented as follows: defining a power adjustment priority of a carrier; and determining a carrier with a higher power adjustment priority on which the transmit power configured or indicated by the base station is to be used, and determining the other carrier on which the transmit power less than or equal to the transmit power configured or indicated by the base station is to be used.

In actual application, the power adjustment priority of the carrier may be defined based on an actual requirement. This is not specifically limited in this embodiment of this application. The following provides an example of several definitions of carrier power adjustment priorities.

Definition 1: A carrier on which a high-priority service is transmitted has a high power adjustment priority.

For example, a priority of an ultra-reliable and low latency communications (Ultra Reliable Low Latency Communication, URLLC) service is higher than a priority of an enhanced mobile broadband (Enhance Mobile Broadband, eMBB) service. Therefore, a power adjustment priority of a carrier on which the URLLC service is transmitted is higher than a power adjustment priority of a carrier on which the eMBB service is transmitted.

Certainly, a service priority may be defined based on an actual requirement. This is not specifically limited in this embodiment of this application, and the foregoing example also constitutes no limitation on a definition of the service priority.

Definition 2: A carrier with a high carder priority has a high power adjustment priority.

A service priority may be defined based on an actual requirement. This is not specifically limited in this embodiment of this application.

Definition 3: A carrier on which a carrier demodulation reference signal exists at a power adjustment location has a high power adjustment priority. Definition 4: A carrier on which data is transmitted earlier has a higher power adjustment priority.

Definition 5: A carrier on which a signal that includes data or control signaling is transmitted has a higher power adjustment priority than a carrier on which a signal that does not include data or control signaling is transmitted.

Optionally, the signal that does not include the data or control signaling may include an SRS signal, a TRACH signal, or the like.

it should be noted that the definition of the power adjustment priority may be set based on an actual requirement. This is not specifically limited in this embodiment of this application. The foregoing definitions are merely examples for reference, and constitute no specific limitation.

It should be further noted that this embodiment of this application describes a scenario in which the UE transmits services on the first carrier and the second carrier. n actual application, in a scenario in which the UE transmits services on more than two carriers, the scenario may be divided. To be specific, one of every two carries is used as a first carrier, and the other one is used as a second carrier, to perform the service transmission method provided in this application. Therefore, the service transmission method provided in this embodiment of this application is also applicable to the scenario in which the UE transmits services by using more than two carriers.

A transmit power of sending the first signal at a location on the first carrier except the first symbol set by the UE and a transmit power of sending the second signal at a location on the second carrier except the second symbol set by the UE may be determined based on whether a time resource at each location overlaps with a. time resource for sending a signal on another carrier. When the time resources overlap, the transmit powers may be determined by using the solution of this application, and details are not described herein. When the time resources do not overlap, the signal is sent by using the transmit power configured or indicated by the base station.

According to the service transmission method provided in this embodiment of this application, when the UE communicates with a base station by using a plurality of carriers, based on a power capability of the UE, at a symbol set location at which time resources overlap, signals are transmitted on some carriers by using a transmit power configured or indicated by the base station, and signals are transmitted on some other carriers by using a transmit power obtained by reducing the transmit power configured or indicated by the base station, so as to control a transmit power on each carrier based on a capability range of the UE at a symbol set location at which time resources of the plurality of carriers overlap. If the plurality of carriers used by the UE have different numerologies, when the UE transmits signals by using the plurality of carriers, according to the service transmission method provided in this application, the UE may control, at any time based on an actual service requirement, a transmit power at the symbol set location at which the time resources of the plurality of carriers overlap. This process is not limited by a scheduling moment of transmitting a service on a carrier. Therefore, in a scenario in which a plurality of carriers configured for same UE support different numerologies, a carrier power is adjusted, so as to ensure that a high-priority carrier has an enough transmit power.

Optionally, after S501 and S502, the second base station may not be notified of adjustment of the transmit power on the second carrier, and the second base station directly demodulates the received signal. Alternatively, after S501 and S502, the second base station may be notified of adjustment of the transmit power on the second carrier, and the second base station demodulates the received signal differently based on the power adjustment.

After S501 and S502, whether the UE notifies the second base station of the adjustment of the transmit power on the second carrier may be determined based on an actual requirement. This is not specifically limited in this embodiment of this application.

For example, if the second base station cannot better demodulate the received signal even if the second base station is notified of the adjustment of the transmit power on the second carrier, after S501 and S502, the second base station may not be notified of the adjustment of the transmit power on the second carrier. For example, the transmit power on the second carrier is adjusted through puncturing. Because the signal received by the second base station on the second symbol set is basically noise, the signal cannot be better demodulated even if power compensation is performed, In this case, the second base station may not be notified of the adjustment of the transmit power on the second carrier. For example, an SRS signal or a PRACH signal is transmitted on the second carrier, and this type of signal is of low importance. In this case, the second base station may not be notified of the adjustment of the transmit power on the second carrier. For another example, the second symbol set includes all symbols used for the second signal. Therefore, reduction proportions of transmit powers on all the symbols are the same, and transmit powers on all symbols for the second signal received by the second base station have a same value. The signal can be well demodulated even if power compensation is not performed. In this case, the second base station may not be notified of the adjustment of the transmit power on the second carrier.

Certainly, the foregoing examples merely enumerate some situations in which the second base station may not be notified of the adjustment of the transmit power on the second carrier, and do not constitute specific limitation.

Figure 7:
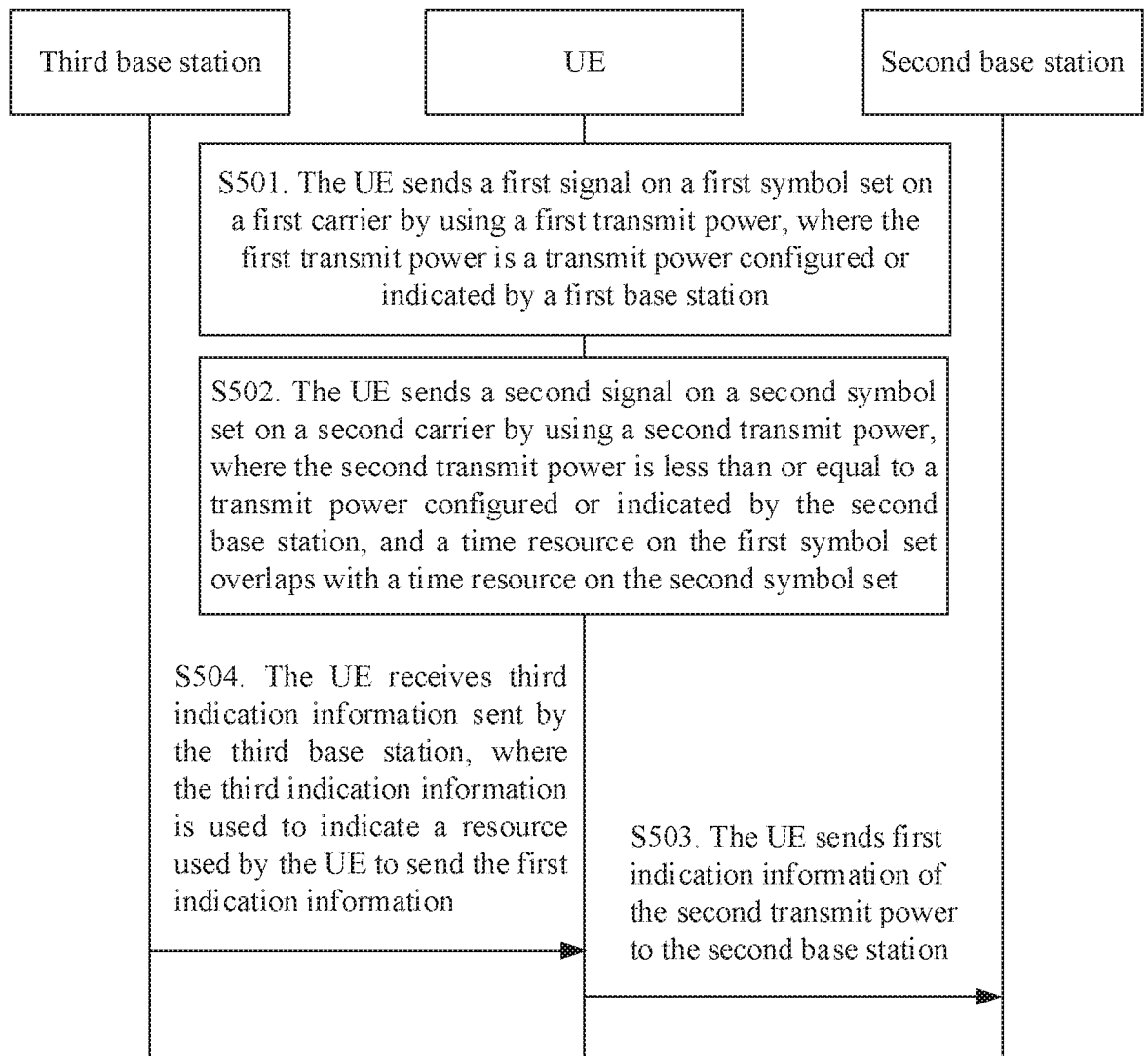
FIG. 7 is a schematic flowchart of another service transmission method according to an embodiment of this application.

Further, after S501 and S502, if the second base station is notified of the adjustment of the transmit power on the second carrier, as shown in FIG. 7, after S501 and S502, the service transmission method provided in this embodiment of this application may further include S503.

S503. The UE sends first indication information of the second transmit power to the second base station.

Specifically, the first indication information is used to notify the second base station of a parameter used when the UE adjusts the transmit power on the second carrier. The second base station may determine, based on the parameter, a value used when the UE adjusts the transmit power on the second carrier or a location at which the UE adjusts the transmit power on the second carrier.

Optionally, the first indication information may include at least one of the following information: power information of the second transmit power and resource information of the second symbol set.

Optionally, when the second base station itself can determine the location of the second symbol set, the first indication information may include only the power information of the second transmit power. When the second base station itself can determine the value of the second transmit power, the first indication information may include only the resource information of the second symbol set. When the second base station itself cannot determine the value of the second transmit power and the location of the second symbol set, the first indication information may include the resource information of the second symbol set and the resource information of the second symbol set.

For example, when a same rule for determining the location of the second symbol set is configured for the second base station and the UE, the second base station itself can determine the location of the second symbol set. When a same rule for determining a value of the second transmit power is determined for the second base station and the UE, the second base station itself can determine the value of the second transmit power. Certainly, in another case in actual application, the second base station itself can also determine the location of the second symbol set, or the second base station itself can also determine the value of the second transmit power. Details are not described in this embodiment of this application.

The power information of the second transmit power is used to reflect the value of the second transmit power, and is used to indicate the value of the second transmit power determined by the base station. The power information of the second transmit power may include at least one of the following information: an absolute value of the second transmit power, a value of the power adjustment factor of the second transmit power, and second indication information of the power adjustment factor of the second transmit power.

Optionally, when the second transmit power is determined through puncturing, the first indication information indicates that the second transmit power is 0.

Specifically, the absolute value of the second transmit power is the value of the second transmit power value. Once the second base station receives the absolute value of the second transmit power, the second base station may directly determine the value of the second transmit power.

The value of the power adjustment factor of the second transmit power is a ratio of the second transmit power to the transmit power configured or indicated by the second base station. When receiving the value of the power adjustment factor of the second transmit power, the second base station multiplies the value of the power adjustment factor of the second transmit power by the transmit power configured or indicated by the second base station, to obtain the value of the second transmit power.

The second indication information of the power adjustment factor of the second transmit power is information used to indicate the value of the power adjustment factor of the second transmit power. The information has a fixed correspondence with the power adjustment factor of the second transmit power. When receiving the second indication information of the power adjustment factor of the second transmit power, the second base station may obtain the value of the power adjustment factor of the second transmit power based on the fixed correspondence between the information and the power adjustment factor, and multiply the value of the power adjustment factor of the second transmit power the transmit power configured or indicated by the second base station, to obtain the value of the second. transmit power.

For example, the second indication information of the power adjustment factor of the second transmit power may be calculation conversion of the value of the power adjustment factor of the second transmit power, for example, a square or a multiple. Alternatively, the second indication information of the power adjustment factor of the second transmit power may be a binary representation of a location of the power adjustment factor of the second transmit power in a preset power adjustment factor set of the UE, or the like.

Certainly, the second indication information of the power adjustment factor of the second transmit power may alternatively be in another form. Any information used to represent the value of the power adjustment factor of the second transmit power may be referred to as the second indication information of the power adjustment factor of the second transmit power.

For example, it is assumed that the power adjustment factor of the second transmit power is 0.3, the preset power adjustment factor set of the UE is [0, 0.1. 0.3, 0.4, 0.6, 0.7, 0.9, 1], and the power adjustment factor of the second transmit power is 0.3 and is the third value in the preset power adjustment factor set of the UE. In this case, the second indication information of the power adjustment factor of the second transmit power is 011 indicated in a binary form of three bits.

The resource information of the second symbol set is used to reflect a location at which the UE adjusts a power on the second carrier, and is used to indicate a location at which the base station determines to send the second signal by using the second transmit power. The resource information of the second symbol set may include at least one of the following information used for the second symbol set: time information, frequency information, carrier information, space domain information, and codeword information.

Optionally, in S503, a resource used by the UE to send the first indication information to the second base station may be determined by the UE, or may be scheduled by the base station. This is not specifically limited in this embodiment of this application. The resource used to send the first indication information includes at least one of the following resources: a time resource, a frequency resource, a carrier resource, a space domain resource, and a codeword resource.

Optionally, the time resource used by the UE to send the first indication information may be at a tail of data on the first carrier, or after data is transmitted on the first carder, or after data is transmitted on the second carrier.

When the resource used by the UE to send the first indication information to the second base station is determined by the UE, a process of determining performed by the UE is not limited in this embodiment of this application.

Further, when the resource used by the UE to send the first indication information to the second base station is determined by the base station, as shown in FIG. 7, before S503, the service transmission method provided in this embodiment of this application may further include S504.

S504. The UE receives third indication information sent by a third base station, where the third indication information is used to indicate a resource used by the UE to send the first indication information.

Optionally, the third base station may be the first base station or the second base station, and the first base station may be the same as or different from the second base station. This is not specifically limited in this embodiment of this application.

Correspondingly, that the UE sends first indication information of the second transmit power to the second base station in S503 may be specifically implemented as follows: The UE sends the first indication information to the second base station by using the resource that is indicated by the third indication information and that is used by the UE to send the first indication information.

It should be noted that a sender of the third indication information, the resource used to send the third indication information, and content of the third indication information are not specifically limited in this embodiment of this application. Any information used to indicate the resource used by the UE to send the first indication information may be referred to as the third indication information described in this embodiment of this application.

Further, optionally, indication information of a transmit power on each carrier may be configured for the UE in a communications system. A manner of sending the indication information is the same as a manner of sending the first indication information. Details are not described herein.

Further, after S503, specific processing after the second base station receives the first indication information is described in detail in a subsequent embodiment.

Figure 8:
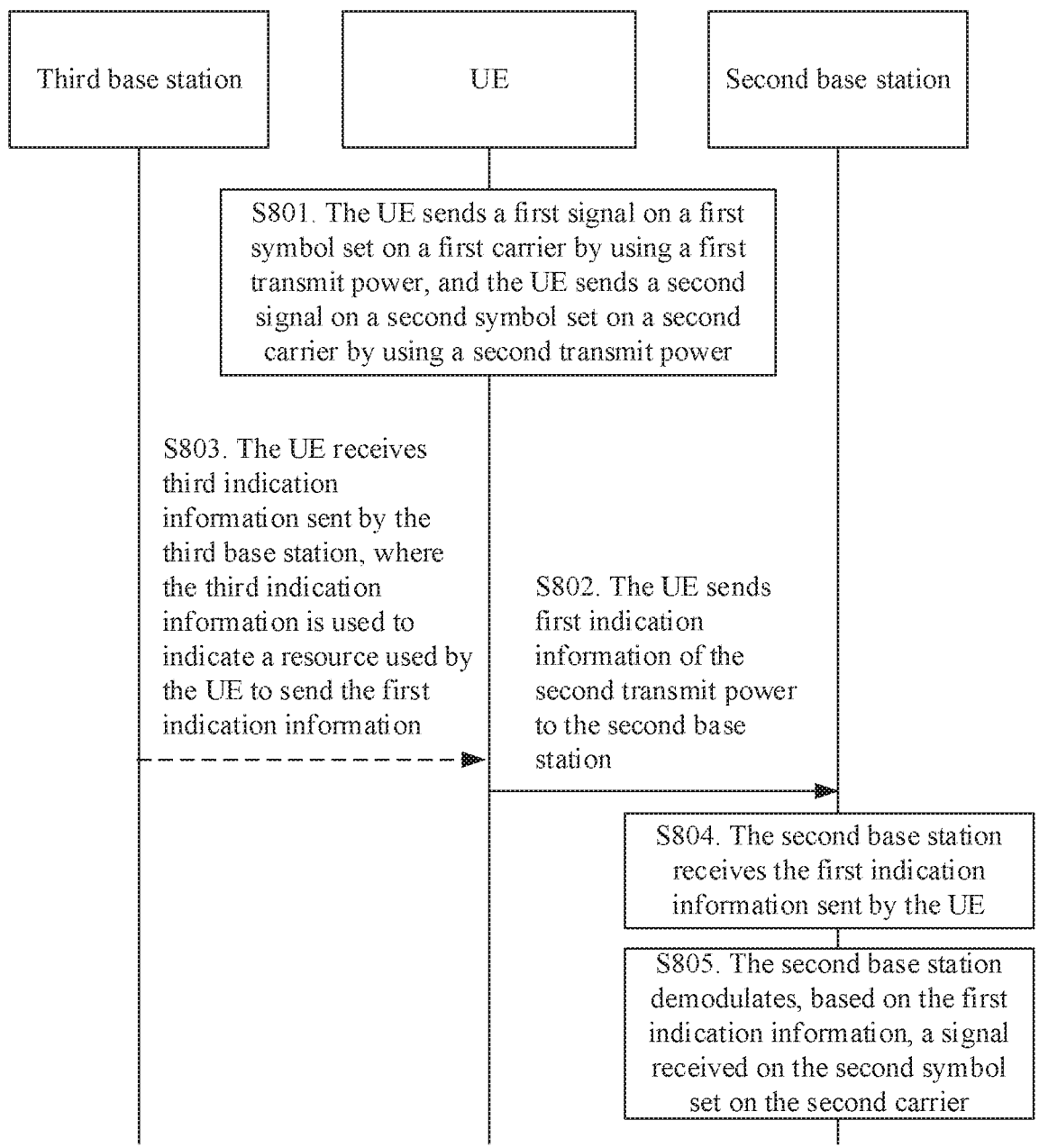
FIG. 8 is a schematic flowchart of still another service transmission method according to an embodiment of this application.

According to another aspect, an embodiment of this application provides another service transmission method. The method is applied to a process of interaction between UE and a base station. As shown in FIG. 8. the method may include the following steps:

S801. UE sends a first signal on a first symbol set on a first carrier by using a first transmit power, and the UE sends a second signal on a second symbol set on a second carrier by using a second transmit power.

It should be noted that a process of S801 is the same as processes of S501 and S502. For specific implementation of S801, refer to specific descriptions of S501 and S502 in the foregoing embodiment. Details are not described herein, S802. The UE sends first indication information of the second transmit power to a second base station.

It should be noted that a process of S802 is the same as a process of S503. For specific implementation of S802, refer to a specific description of S503 in the foregoing embodiment. Details are not described herein.

Optionally, in S802, a resource used by the UE to send the first indication information to the second base station may be determined by the UE, or may be scheduled by the base station. This is not specifically limited in this embodiment of this application.

Optionally, when the resource used by the UE to send the first indication information to the second base station is determined by the base station, as shown in FIG. 8, the service transmission method provided in this embodiment of this application may further include:

S803. The UE receives third indication information sent by a third base station, where the third indication information is used to indicate a resource used by the UE to send the first indication information.

it should be noted that a process of S803 is the same as a process of S504. For specific implementation of S803, refer to a specific description of S504 in the foregoing embodiment. Details are not described herein.

S804. The second base station receives the first indication information sent by the UE.

The UE sends a signal on the first symbol set on the first carrier by using the first transmit power, and the UE sends a signal on the second symbol set on the second carrier by using the second transmit power. A time resource on the first symbol set overlaps with a time resource on the second symbol set. The first transmit power is a transmit power configured or indicated by the first base station. The second transmit power is less than or equal to a transmit power configured or indicated by the second base station.

It should be noted that a process before the UE sends the first indication information has been described in detail in S501 and S502. Details are not described herein, Further, when the third base station is the second base station in S803, S804 may be specifically implemented as follows: The second base station receives, by using the resource that is used by the UE to send the first indication information and that is indicated by the third indication information, the first indication information sent by the UE.

S805. The second base station demodulates, based on the first indication information, a signal received on the second symbol set on the second carrier.

The signal received on the second symbol set includes at least one of the following signals: a data signal, a control signal, a reference signal, and an access signal. The signal received by the second base station on the second symbol set is the second signal sent by the UE on the second symbol set in S801. Details are not described herein.

Optionally, based on different content of the first indication information, a specific process of S805 may be implemented by using the following two implementation solutions:

Solution 1: The first indication information includes power information of a transmit power on the second carrier and/or resource information of the second symbol set on the second carrier.

In Solution 1, S805 may be specifically implemented as follows: The second base station performs, based on the power information of the transmit power, power compensation on the signal received on the second symbol set on the second carrier, and then performs demodulation.

Further, in Solution 1, if the second symbol set includes a demodulation reference signal of the second carrier, after the second base station performs, based on the power information of the transmit power, the power compensation on the signal received on the second symbol set on the second carrier, and then performs the demodulation, the second base station demodulates, based on a demodulation reference signal obtained after the power compensation, another signal on the second. carrier except the second symbol set.

Further, in Solution 1, if the second symbol set does not include a demodulation reference signal of the second carrier, the second base station directly demodulates the another signal on the second carrier except the second symbol set, Solution 2: The first indication information indicates that the second transmit power is 0, and specific implementation of S805 may include any one of the following three cases.

In a first case, the second base station uses, as a prior signal, the signal received on the second symbol set on the second carrier, and demodulates the signal received on the second symbol set on the second carrier.

During signal sending, signals on symbols have specific association. Therefore, based on the association, even if only noise is left when a signal with a transmit power of 0 is received, the signal with the transmit power of 0 may be used as a prior signal to demodulate the signal received on the second symbol set.

Optionally, in the first case, after the second base station demodulates, based on the first indication information, the signal received on the second symbol set on the second carrier, the second base station may further demodulate, by using a prior signal, a signal received at a location on the second carrier except the second symbol set.

In a second case, the second base station directly demodulates the signal received on the second symbol set on the second carrier, and may subsequently restore the signal from noise by using a technology such as error correction coding.

In a third case, the second base station skips the signal received on the second symbol set on the second carrier.

In the third case, the second base station discards the signal received on the second symbol set on the second carrier.

Further, optionally, indication information of a transmit power on each carrier may be configured for the UE in a communications system. A manner of sending the indication information is the same as a manner of sending the first indication information. Details are not described herein. When the UE sends the indication information of the transmit power on each carrier, a processing process of the base station receiving the indication information is the same as a processing process of the second base station in 5805, and details are not described herein.

According to the service transmission method provided in this embodiment of this application, after the UE controls the transmit power on each carrier based on a capability range of the UE at a symbol set location at which time resources of a plurality of carriers overlap, the base station demodulates the received signal based on an indication of the UE. If the transmit power configured or indicated by the second base station is reduced when the UE controls a transmit power on a carrier, after receiving the signal, the second base station may adjust the power based on the first indication information, and then perform demodulation, thereby improving demodulation accuracy of the base station.

The following uses specific scenarios as examples to describe the service transmission method provided in this embodiment of this application. The following examples are merely intended to describe, by using examples, the service transmission method provided in the embodiments of this application, and do not constitute specific limitation on an application scenario and an implementation process of the service transmission method provided in the embodiments of this application.

EXAMPLE 1

Figure 9:
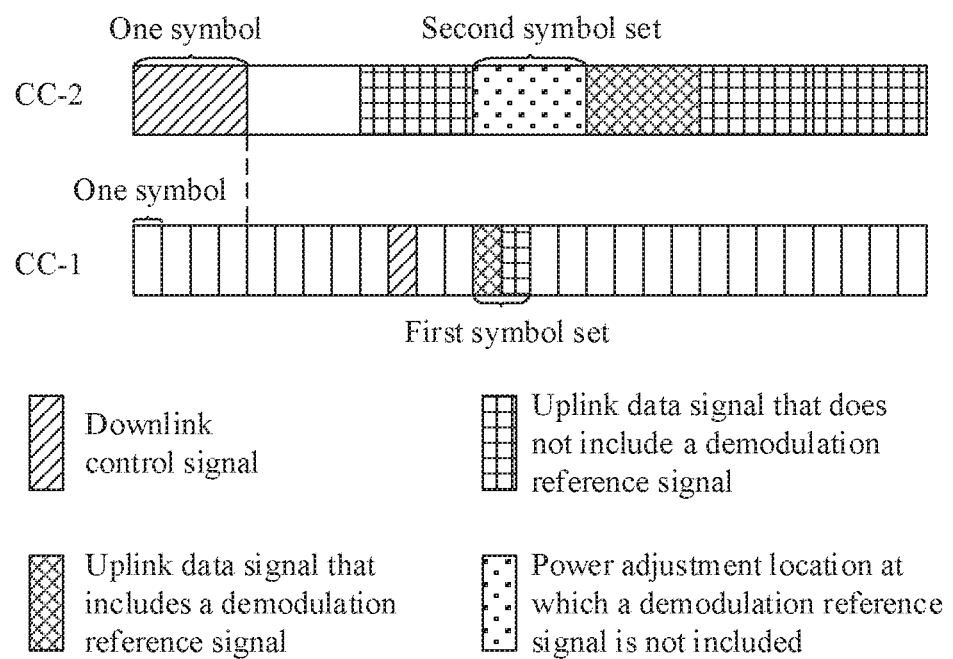
FIG. 9 is a time-domain structural diagram in which different numerologies are configured for different carriers according to an embodiment of this application.

It is assumed that when UE 1 accesses a network, a maximum transmit power Pmax1 configured for the UE 1 is 4 W in the network, and a preset power adjustment factor set of the UE 1 is [0, 0.1, 0.3, 0.4, 0.6, 0.7, 0.9, 1]. It As shown in FIG. 9, CA is configured for the UE 1, and the UE 1 communicates with a first base station by using two carriers. Two uplink carriers are configured for the UE I, namely, a first carrier and a second carrier. The first carrier is denoted as CC-1, and the second carrier is denoted as CC-2. Herein, CC-1 and CC-2 have different numerologies. A subcarrier spacing of CC-1 is four times a subcarrier spacing of CC-2. Therefore, as shown in FIG. 9, a symbol length of CC-2 is four times a symbol length of CC-1. It is assumed that the first base station schedules low-priority uplink data transmission on CC-2, for example, transmission of an eMBB service, a second signal is sent, and a transmit power that is configured or indicated by the first base station and that is on CC-2 is 3 W. After the transmission on CC-2 is scheduled, the first base station further schedules high-priority uplink data transmission on CC-1, for example, transmission of a URLLC service, a first signal is sent, and a transmit power that is configured or indicated by the first base station and that is on CC-1 is 2 W. A first symbol set on CC-1 and a second symbol set on CC-2 in the example are respectively defined as a symbol to which an overlapping part between a time resource for sending the first signal and a time resource for sending the second signal belongs on CC-1 and a symbol to which the overlapping part belongs on CC-2. Specific locations of the first symbol set and the second symbol set are indicated in FIG. 9. In addition, the overlapping part between the time resource on the first symbol set and the time resource on the second symbol set does not include a demodulation reference signal on CC-2.

In the example, it is defined that a carrier on which a high-priority service is transmitted has a high power adjustment priority. When the UE 1 receives scheduling of sending the first signal, because a sum of a transmit power of sending the first signal and a transmit power of sending the second signal is 5 W and is greater than the Pmax1 of 4 W configured for the UE 1 when the UE 1 accesses the network, in this case, the UE 1 needs to perform power adjustment according to the method in this embodiment of this application.

Because CC-1 has a higher power adjustment priority than CC-2, the UE 1 ensures that the first signal is sent on the first symbol set on CC-1 b using the transmit power of 2 W configured or indicated by the first base station. Then the UE 1 selects a proper power adjustment factor 0.6 from the preset power adjustment factor set of the UE 1, so that the second signal is sent on the second symbol set on CC-2 by using a transmit power of 1.8 V. In this way, it is ensured that a sum of the transmit power of sending the first signal on the first symbol set on CC-1 and the transmit power of sending the second signal on the second symbol set on CC-2 is 3.8 W and is less than Pmax1.

A specific adjustment result is as follows: The UE 1 sends the first signal on the first symbol set on CC-1 by using the transmit power of 2 W configured or indicated by the first base station, and the UE 1 sends the second signal on the second. symbol set on CC-2 by using the transmit power of 1.8 W less than the transmit power of 3 W configured or indicated by the first base station.

Further, a transmit power of sending the first signal at a location on CC-1 except the first symbol set may be 2 W, and a transmit power of sending the second signal at a location on CC-2 except the second symbol set may be 3 W.

Further, in the example, because only the transmit power of the second symbol set on CC-2 is adjusted, after adjusting the transmit power and transmitting a service, the UE 1 sends a power adjustment indication to the first base station. It is assumed that the UE 1 further receives signaling that is of scheduling the power adjustment indication and that is sent by the first base station. The signaling is used to instruct the UE 1 to attach the power adjustment indication to a tail of data on CC-1, and transmit the power adjustment indication as a part of a signal on CC-1. Therefore, the UE 1 attaches the power adjustment indication to the tail of the data on CC-1, and transmits the power adjustment indication as the part of the signal on CC-1 to the first base station. Because the UE 1 communicates with the first base station by using CC-1 and CC-2, the first base station itself can know power adjustment locations (the first symbol set and the second symbol set) of two carriers. In addition, because a power adjustment scheme is known to both the first base station and the UE 1, the base station may also determine that the second symbol set on CC-2 is adjusted, and the power adjustment indication sent by the UE 1 includes only power information of a transmit power on the second symbol set on CC-2. Therefore, content of the power adjustment indication may be indication information 101 of a power adjustment factor, and the indication information 101 is used to indicate that a power adjustment value is the fifth power adjustment factor 0.6 in the power adjustment factor set of the UE 1.

After receiving the power adjustment indication, the first base station may perform, based on the power information in the power adjustment indication, power compensation on the second signal received on the second symbol set on CC-2, and then performs demodulation. A signal received at a location on CC-2 except the second symbol set may be directly demodulated. All signals on CC-1 may be directly demodulated.

For example, a process in which the first base station performs, based on the power information in the power adjustment indication, the power compensation on the second signal received on the second symbol set on CC-2 may include that the first base station amplifies a power of the second signal received on the second symbol set on CC-2, to compensate for a transmit power reduced when the UE sends the second signal on the second symbol set on CC-2, so that the power of the second signal received on the second symbol set on CC-2 is restored to the transmit power configured or indicated by the first base station.

EXAMPLE 2

Based on Example 1, DC is configured for the UE 1. This is different from Example 1. The UE 1 communicates with the first base station by using CC-1, and communicates with a second base station by using CC-2. A transmit power adjustment process in Example 2 is the same as that in Example 1, and details are not described herein. Content of the power adjustment indication sent by the UE 1 to the second base station and a location at which the UE 1 sends the power adjustment indication to the second base station in Example 2 are different from the content and the location in Example 1.

In Example 2, CC-1 and CC-2 are used for communication with different base stations. Therefore, in Example 2, the UE 1 receives the signaling that is of scheduling the power adjustment indication and that is sent by the second base station. The signaling is used to instruct the UE 1 to separately send the power adjustment indication on CC-2 after data transmission is completed on CC-2. Therefore, in Example 2, after sending the second signal on CC-2, the UE 1 separately sends the power adjustment indication to the second base station on CC-2. The UE 1 communicates with different base stations by using CC-1 and CC-2. Therefore, the second base station itself cannot know power adjustment locations (the first symbol set and the second symbol set) of two carriers. Therefore, the power adjustment indication sent by the UE 1 includes power information of a transmit power on the second symbol set on CC-2 and resource information of the second symbol set. The content of the power adjustment indication may be the indication information 101 of the power adjustment factor and the resource information of the second symbol set on CC-2.

After the power adjustment indication is received, a processing process of the second base station is the same as a processing process after the first base station receives the power adjustment indication in Example 1. Details are not described herein.

EXAMPLE 3

Based on Example 1 or Example 2, the transmit power that is of sending the first symbol and that is configured or indicated on CC-1 is 4 W. This is different from Example 1 or Example 2. A transmit power adjustment process in Example 3 is different from that in Example 1 or Example 2. Details are described below When the UE 1 receives scheduling of CC-1, because a sum of the transmit power of sending the first signal on CC-1 and the transmit power of sending the second signal on CC-2 is 7 W and is greater than the maximum transmit power of 4 W configured for the UE 1 when the UE 1 accesses the network. In this case, the UE 1 needs to perform power adjustment according to the method in this embodiment of this application. Because CC-1 has a higher power adjustment priority than CC-2, the UE 1 ensures that the first signal is sent on the first symbol set by using the transmit power of 4 W configured or indicated on CC-1. The UE 1 performs puncturing on the second signal sent on the second symbol set on CC-2, and a transmit power of the second signal is 0 W In this way, it is ensured that a sum of the transmit power of sending the first signal sent on the first symbol set on CC-1 and the transmit power of sending the second signal sent on the second symbol set on CC-2 is 4 W and is equal to Pmax1.

Further, in Example 3, because puncturing is directly performed on the signal on the second symbol set on CC-2, the base station cannot receive any signal at a location of the second symbol set on CC-2, and cannot perform demodulation even if power compensation is performed. Therefore, in Example 3, after adjusting a transmit power and transmitting a service, the UE 1 may not send the power adjustment indication to the base station communicating with the UE 1 by using CC-2.

Further, in Example 3, the base station communicating with the UE 1 by using CC-2 may directly demodulate the signal received on the second symbol set on CC-2.

EXAMPLE 4

Figure 10:
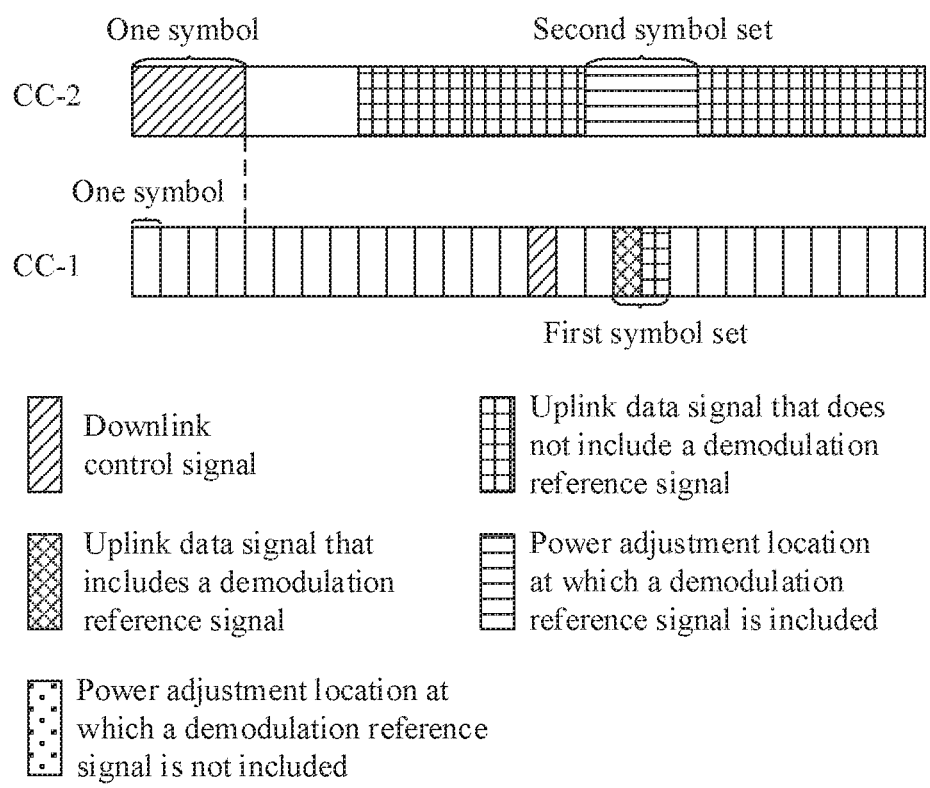
FIG. 10 is another time-domain structural diagram in which different numerologies are configured for different carriers according to an embodiment of this application.

It is assumed that when UE 2 accesses a network, a maximum transmit power Pmax2 configured for the UE 2 is 4 W in the network, and a preset power adjustment factor set of the UE 2 is [0, 0.1, 0.3, 0.4, 0.6, 0.7, 0.9, 1]. As shown in FIG. 10, CA or DC is configured for the UE 2, and the UE 2 communicates with a same base station or different base stations by using two carriers. Two uplink carriers are configured for the UE 2, namely, a first carrier and a second carrier. The first carrier is denoted as CC-1, and the second carrier is denoted as CC-2. Herein, CC-1 and CC-2 have different numerologies. A subcarrier spacing of CC-1 is four times a subcarrier spacing of CC-2. Therefore, as shown in FIG. 10, a symbol length of CC-2 is four times a symbol length of CC-1. It is assumed that low-priority uplink data transmission is scheduled on CC-2, for example, an eMBB service, a second signal is sent, and a transmit power that is of sending the second signal by the UE 2 and that is configured or indicated by the base station communicating with the UE 2 by using CC-2 is 3 W. After the transmission on CC-2 is scheduled, high-priority uplink data transmission is scheduled on CC-1, for example, transmission of a URLLC service, a first signal is sent, and a transmit power that is of sending the first signal by the UE 2 and that is configured or indicated by the base station communicating with the UE 2 by using CC-1 is 3 W. A first symbol set on CC-1 and a second symbol set on CC-2 in the example are respectively defined as a symbol to which an overlapping part between a time resource for sending the first signal and a time resource for sending the second signal belongs on CC-1 and a symbol to which the overlapping part belongs on CC-2. Specific locations of the first symbol set and the second symbol set are indicated in FIG. 10. In addition, the overlapping part between the time resource on the first symbol set and the time resource on the second symbol set includes a demodulation reference signal on CC-2.

In Example 4, it is defined that a carrier on which a high-priority service is transmitted has a high power adjustment priority. When the UE 2 receives scheduling of sending the first signal, because a sum of the transmit power of sending the first signal and the transmit power of sending the second signal is 5 W and is greater than the Pmax2 of 4 W configured for the UE 2 when the UE 2 accesses the network, in this case, the UE 1 needs to perform power adjustment according to the method in this embodiment of this application.

Because CC-1 has a higher power adjustment priority than CC-2, the UE 2 ensures that a service is transmitted on the first symbol set on CC-1 by using the transmit power of 3 W configured or indicated by the first base station. Then the UE selects a proper power adjustment factor 0.3 from the preset power adjustment factor set of the UE 2, so that a transmit power on the second symbol set on CC-2 is 0.9 W. In this way, it is ensured that a sum of the transmit power of sending the first signal on the first symbol set on CC-1 and the transmit power of sending the second signal on the second symbol set on CC-2 is 3.9 W and is less than Pmax2.

A specific adjustment result is as follows: The UE 2 sends the first signal on the first symbol set on CC-1 by using the transmit power of 3 W configured or indicated by the first base station, and the UE 2 sends the second signal on the second symbol set on CC-2 by using the transmit power of 0.9 W less than the transmit power of 3 W configured or indicated by the second base station.

Further, a transmit power of sending the first signal at a location on CC-1 except the first symbol set may be 3 W, and a transmit power of sending the second signal at a location on CC-2 except the second symbol set may be 3 W.

Further, in the example, because only the transmit power of the second symbol set on CC-2 is adjusted, after adjusting the transmit power and transmitting a service, the UE 2 sends a power adjustment indication to the second base station. A specific process of sending the power adjustment indication is the same as that in Example 1 or Example 2, and details are not described herein.

After receiving the power adjustment indication, because the second symbol set includes the demodulation reference signal on CC-2, the base station communicating with the UE 2 by using CC-2 may perform, based on power information in the power adjustment indication, power compensation on the signal received on the second symbol set on CC-2, and then perform demodulation. After the power compensation is performed on the signal received on the second symbol set, a signal received at a location on CC-2 except the second symbol set may be demodulated by using a demodulation reference signal obtained after the power compensation. All signals on CC-1 may be directly demodulated.

For example, a process in which the base station communicating with the UE 2 by using CC-2 performs, based on the power information in the power adjustment indication, the power compensation on the second signal received on the second symbol set on CC-2 may include that the base station communicating with the UE 2 by using CC-2 amplifies a power of the second signal received on the second symbol set on CC-2, to compensate for a transmit power reduced when the UE sends the second signal on the second symbol set on CC-2, so that the power of the second signal received on the second symbol set on CC-2 is restored to the transmit power configured or indicated by the first base station.

EXAMPLE 5

Figure 11:
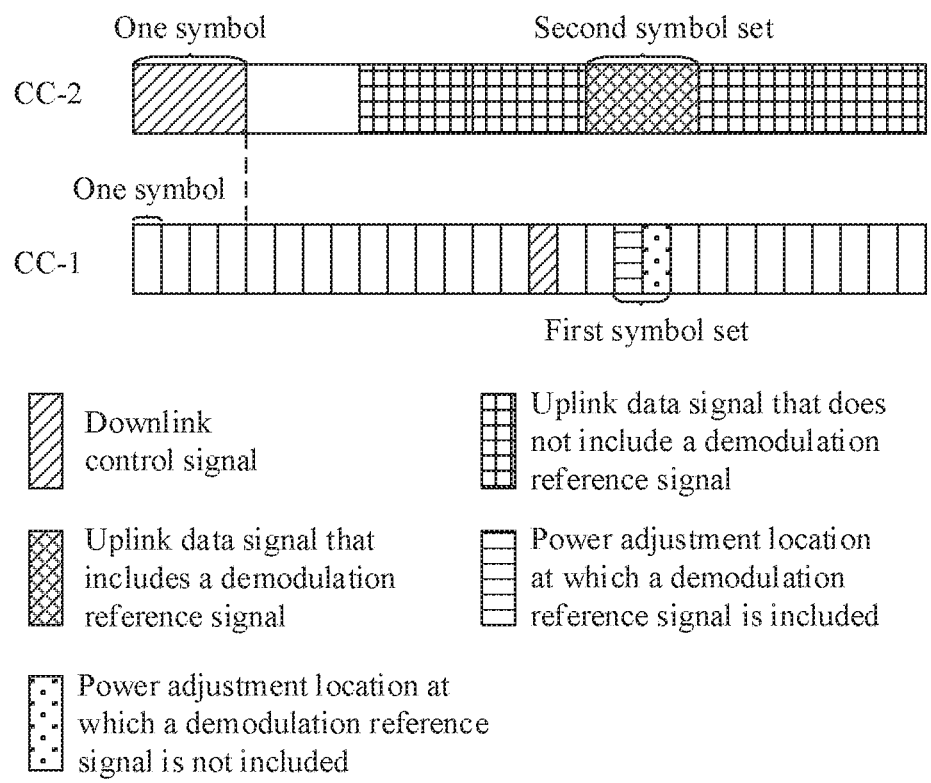
FIG. 11 is still another time-domain structural diagram in which different numerologies are configured for different carriers according to an embodiment of this application.

It is assumed that when UE 3 accesses a network, a maximum transmit power Pmax3 configured for the UE 3 is 4 W in the network, and a preset power adjustment factor set of the UE 3 is [0, 0.1, 0.3, 0.4, 0.6, 0.7, 0.9, 1]. It As shown in FIG. 11, CA or DC is configured for the UE 3. and the UE 3 communicates with a same base station or different base stations by using two carriers. Two uplink carriers are configured for the UE 3. namely, a first carrier and a second carrier. The first carrier is denoted as CC-1, and the second carrier is denoted as CC-2. Herein, CC-1 and CC-2 have different numerologies. A subcarrier spacing of CC-1 is four times a subcarrier spacing of CC-2. Therefore, as shown in FIG. 11, a symbol length of CC-2 is four times a symbol length of CC-1. It is assumed that low-priority uplink data transmission is scheduled on CC-2, for example, an eMBB service, a second signal is sent, and a transmit power that is of sending the second signal and that is configured or indicated by the base station communicating with the UE 3 by using CC-2 is 3 W. After the transmission on CC-2 is scheduled, high-priority uplink data transmission is scheduled on CC-1, for example, transmission of a URLLC service, a first signal is sent, and a transmit power that is of sending the first signal and that is configured or indicated by the base station communicating with the UE 3 by using CC-1 is 3 W. A first symbol set on CC-1 and a second symbol set on CC-2 in the example are respectively defined as a symbol to which an overlapping part between a time resource for sending the first signal and a time resource for sending the second signal belongs on CC-1 and a symbol to which the overlapping part belongs on CC-2. Specific locations of the first symbol set and the second symbol set are indicated in FIG. 11. In Example 5, a time-domain data coincidence part between transmission 1 and transmission 2 includes a demodulation reference signal in transmission 1. In addition, the overlapping part between the time resource on the first symbol set and the time resource on the second symbol set includes a demodulation reference signal on CC-2.

In Example 5, a carrier whose power adjustment location includes a carrier demodulation reference signal has a high power adjustment priority. This is different from Example 4. When the UE 3 receives scheduling of transmitting a service on CC-1, because a sum of the transmit power of sending the first signal and the transmit power of sending the second signal is 6 W and is greater than the maximum transmit power of 4 W configured for the UE 3 when the UE 3 accesses the network, the UE 3 needs to perform power adjustment according to the method in this embodiment of this application. Specific adjustment may include that, because CC-2 has a higher power adjustment priority than CC-1, the UE 3 ensures that the second signal is sent on the second symbol set on CC-2 by using the transmit power of 3 W that is of sending the second signal and that is configured or indicated by the base station communicating with the UE 3 by using CC-2; and then the UE 3 selects a proper power adjustment factor 0.3 from the preset power adjustment factor set of the UE 3, so that the UE 3 sends the first signal on the first symbol set on CC-1 by using a transmit power of 0.9 W. In this way, it is ensured that a sum of the transmit power of sending the first signal on the first symbol set on CC-1 and the transmit power of sending the second signal on the second symbol set on CC-2 is 3.9 W and is less than Pmax3.

A specific adjustment result is as follows: The UE 3 sends the first signal on the first symbol set on CC-1 by using the transmit power of 0.9 W less than the transmit power of 3 W configured or indicated by the base station, and the UE 3 sends the second signal on the second symbol set on CC-2 by using the transmit power of 3 W configured or indicated by the base station.

Further, a transmit power of sending the first signal at a location on CC-1 except the first symbol set may be 3 W, and a transmit power of sending the second signal at a location on CC-2. except the second symbol set may be 3 W.

Further, in Example 5, because the first symbol set on CC-1 includes all symbols for sending the first signal, power reduction proportions of data received on the first symbol set on CC-1 by the base station and the demodulation reference signal are the same. In this case, the data can be directly demodulated without compensation.

Therefore, in Example 5, after adjusting a transmit power and transmitting a service, the UE 3 may not send a power adjustment indication to the base station communicating with the UE 3 by using CC-1.

Further, in Example 5, no power adjustment indication is received by the base station. In this case, the base station directly demodulates a received signal.

EXAMPLE 6

Figure 12:
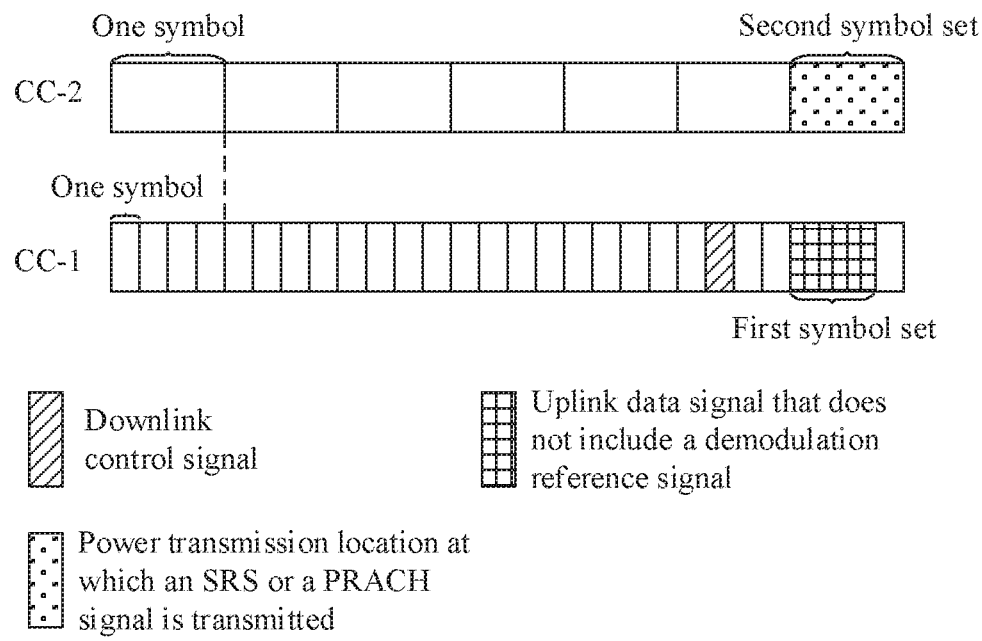
FIG. 12 is yet another time-domain structural diagram in which different numerologies are configured for different carriers according to an embodiment of this application.

It is assumed that when UE 4 accesses a network, a maximum transmit power Pmax4 configured for the UE 4 is 4 W in the network, and a preset power adjustment factor set of the UE 4 is [0, 0.1, 0.3, 0.4, 0.6, 0.7, 0.9, 1]. As shown in FIG. 12, CA or DC is configured for the UE 4, and the UE 4 communicates with a same base station or different base stations by using two carriers. Two uplink carriers are configured for the UE 4, namely, a first carrier and a second carrier. The first carrier is denoted as CC-1, and the second carrier is denoted as CC-2. Herein, CC-1 and CC-2 have different numerologies. A subcarrier spacing of CC-1 is four times a subcarrier spacing of CC-2. Therefore, as shown in FIG. 12, a symbol length of CC-2 is four times a symbol length of CC-1. It is assumed that a low-priority uplink signal (such as an SRS or a PRACH) is periodically scheduled on CC-2, and the uplink signal does not include data or control signaling and is referred to as a second signal. A transmit power that is of sending the second signal and that is configured or indicated by a base station is 3 W After a signal on CC-2 is scheduled, high-priority uplink data transmission is scheduled on CC-1, for example, transmission of a URLLC service, a first signal is sent, and a transmit power that is of sending the first signal and that is configured or indicated by the base station is 3 W. A first symbol set on CC-1 and a second symbol set on CC-2 in the example are respectively defined as a symbol to which an overlapping part between a time resource for sending the first signal and a time resource for sending the second signal belongs on CC-1 and a symbol to which the overlapping part belongs on CC-2. Details of the first symbol set and the second symbol set are indicated in FIG. 12

In the example, it is defined that a carrier on which a service is transmitted has a higher power adjustment priority than a carrier on which a signal that does not include data or control signaling is transmitted. When the UE 4 receives scheduling on CC-1, because a sum of the transmit power of sending the first signal and the transmit power of sending the second signal is 6 W and is greater than the maximum transmit power of 4 W configured for the UE 4 when the UE 4 accesses the network, the UE 4 needs to perform power adjustment according to the method in this embodiment of this application.

Specific adjustment may include that, because CC-1 has a higher power adjustment priority than CC-2, the UE 4 ensures that a service is transmitted on the first symbol set on CC-1 by using the transmit power of 3 W configured or indicated by the first base station; and then the UE 2 selects a proper power adjustment factor 0.3 from the preset power adjustment factor set of the UE 2, so that a transmit power on the second symbol set on CC-2 is 0.9 W. In this way, it is ensured that a sum of the transmit power of sending the first signal on the first symbol set on CC-1 and the transmit power of sending the second signal on the second symbol set on CC-2 is 3.9 W and is less than Pmax4.

A specific adjustment result is as follows: The UE 4 sends the first signal on the first symbol set on CC-1 by using the transmit power of 3 W configured or indicated by the base station, and the UE 2 sends the second signal on the second. symbol set on CC-2 by using the transmit power of 0.9 W less than the transmit power of 3 W configured or indicated by the base station.

Further, a transmit power of sending the first signal at a location on CC-1 except the first symbol set may be 3 W, and a transmit power of sending the second signal at a location on CC-2 except the second symbol set may be 3 W.

Further, in the example, because a transmit power of a very-low-priority periodic uplink signal on CC-2 is adjusted, and a signal of this type is of little importance to the base station, there is no need to indicate, to the base station, power adjustment for the signal.

It should be noted that the foregoing examples are merely intended to illustrate a process of the service transmission method provided in this embodiment of this application, and constitute no specific limitation on the process. In actual application, the solutions in this embodiment of this application are selected and executed according to a specific scenario. Details are not described herein.

The foregoing has mainly described the solutions provided in the embodiments of this application from a perspective of a working process of the UE and the second base station. It may be understood that, to implement the foregoing functions, the UE and the second base station include a corresponding hardware structure and/or software module for performing each of the functions. A person of ordinary skill in the art should be easily aware that, units and algorithm steps in the examples described with reference to the embodiments disclosed in this specification may be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, function modules of the UE and the second base station may be divided based on the foregoing method examples. For example, each function module may be correspondingly divided based on each function, or two or more functions may be integrated into one processing module. The integrated module may be implemented in a form of hardware, or may be implemented in a form of a software function module. It should be noted that, in this embodiment of this application, module division is merely an example, and is merely division of logical functions. During actual implementation, another division manner may be used.

Figure 13:
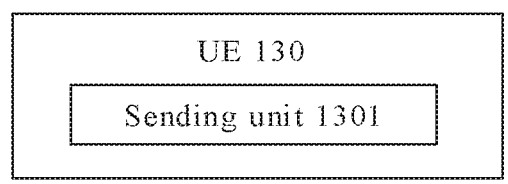
FIG. 13 is a schematic structural diagram of another UE according to an embodiment of this application.

When function modules correspondingly obtained through division based on various functions are used, FIG. 13 is a possible schematic structural diagram of UE according to the foregoing embodiments. The UE 130 may include a sending unit 1301. The sending unit 1301 is configured to support the UE 130 in performing the processes S501 and S502 in FIG. 5 or FIG. 7, the process S503 in FIG. 7, and the process S802 in FIG. 8. For all related content of steps in the foregoing method embodiments, refer to function descriptions of corresponding function modules. Details are not described herein.

Figure 14:
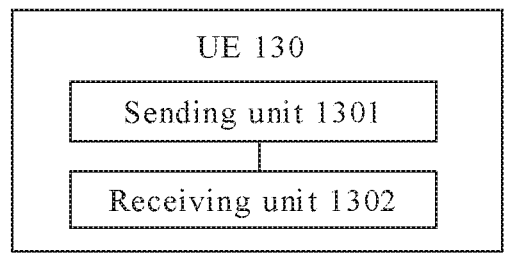
FIG. 14 is a schematic structural diagram of still another UE according to an embodiment of this application.

Optionally, as shown in FIG. 14, the UE 130 may further include a receiving unit 1302. configured to support the UE 130 in performing the process S504 in FIG. 7 and the process S803 in FIG. 8.

Figure 15:
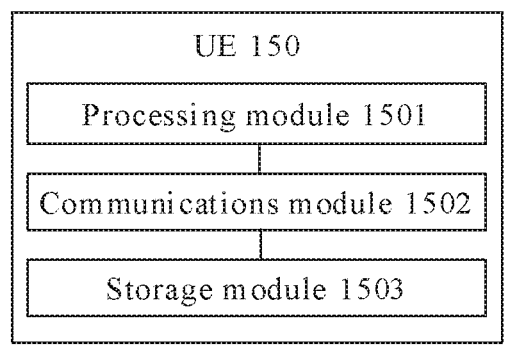
FIG. 15 is a schematic structural diagram of yet another UE according to an embodiment of this application.

When an integrated unit is used, FIG. 15 is a possible schematic structural diagram of UE according to the foregoing embodiments. The UE 150 may include a processing module 1501 and a communications module 1502. The processing module 1501 is configured to control and manage an action of the UE 150. For example, the processing module 1501 is configured to support the UE 150 in performing the processes S501 and 502 in FIG. 5 or FIG. 7 and the process S801 in FIG. 8 by using the communications module 1502. The communications module 1502 is configured to support the UE 150 in communicating with another network entity. The UE 150 may further include a storage module 1503, configured to store program code and data of the UE 150.

The processing module 1501 may be the processor 301 in a physical structure of the UE 30 shown in FIG. 3, and may be a processor or a controller. For example, the processing module 1501 may be a CPU, a general-purpose processor, a DSP, an ASIC, an FPGA or another programmable logic device, a transistor logic device, a hardware component, or any combination thereof. The processing module 1501 may implement or execute various example logical blocks, modules, and circuits described with reference to content disclosed in this application. Alternatively, the processor 1501 may be a combination of processors implementing a computing function, for example, a combination of one or more microprocessors or a combination of the DSP and a microprocessor. The communications module 1502 may be the transceiver 303 in the physical structure of the UE 30 shown in FIG. 3. The communications module 1502 may be a communications port or a transceiver antenna; or may be a transceiver, a transceiver circuit, a communications interface, or the like. The storage module 1503 may be the memory 302 in the physical structure of the UE 30 shown in FIG. 3.

Figure 16:
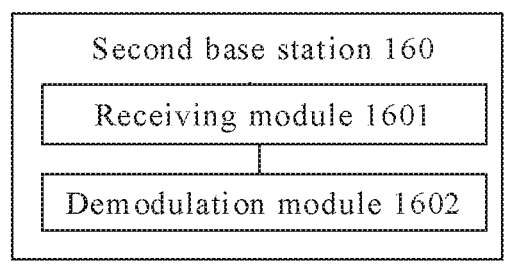
FIG. 16 is a schematic structural diagram of a second base station according to an embodiment of this application.

When the processing module 1501 is a processor, the communications module 1502 is a transceiver, and the storage module 1503 is a memory, the UE 150 in FIG. 15 in this embodiment of this application may be the UE 30 shown in FIG. 3, When function modules correspondingly obtained through division based on various functions are used, FIG. 16 is a possible schematic structural diagram of a second base station according to the foregoing embodiments. The second base station 160 may include a receiving unit 1601 and a demodulation unit 1602. The receiving unit 1602 is configured to support the second base station 160 in performing the process S804 in FIG. 8. The demodulation unit 1602 is configured to support the second base station 160 in performing the process S805 in FIG. 8. For all related content of steps in the foregoing method embodiments, refer to function descriptions of corresponding function modules. Details are not described herein.

Figure 17:
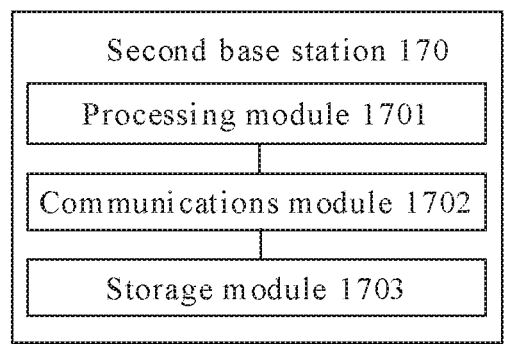
FIG. 17 is a schematic structural diagram of another second base station according to an embodiment of this application.

When an integrated unit is used, FIG. 17 is a possible schematic structural diagram of a second base station according to the foregoing embodiments. The second base station 170 may include a processing module 1701 and a communications module 1702. The processing module 1701 is configured to control and manage an action of the second base station 170. For example, the processing module 1701 is configured to support the second base station 170 in performing the process S804 in FIG. 8 by using the communications module 1702, and the processing module 1701 is configured to support the second base station 170 in performing the process S805 in FIG. 8. The communications module 1702 is configured to support the second base station 170 in communicating with another network entity. The second base station 170 may further include a storage module 1703, configured to store program code and data of the second base station 170.

The processing module 1701 may be the processor 401 in a physical structure of the base station 40 shown in FIG. 4, and may be a processor or a controller. For example, the processing module 1701 may be a CPU, a general-purpose processor, a DSP, an ASIC, an FPGA or another programmable logic device, a transistor logic device, a hardware component, or any combination thereof. The processing module 1701 may implement or execute various example logical blocks, modules, and circuits described with reference to content disclosed in this application. Alternatively, the processor 1701 may be a combination of processors implementing a computing function, for example, a combination of one or more microprocessors or a combination of the DSP and a microprocessor. The communications module 1702 may be the transceiver 403 in the physical structure of the base station 40 shown in FIG. 4. The communications module 1702 may be a communications port or a transceiver antenna; or may be a transceiver, a transceiver circuit, a communications interface, or the like. The storage module 1703 may be the memory 402 in the physical structure of the base station 40 shown in FIG. 4.

When the processing module 1701 is a processor, the communications module 1702 is a transceiver, and the storage module 1703 is a memory, the second base station 170 in FIG. 17 in this embodiment of this application may be the base station 40 shown in FIG. 4.

As described above, the UE and the second base station provided in the embodiments of this application may be configured to implement the method implemented according to the foregoing embodiments of this application. For ease of description, only parts related to the embodiments of this application are shown. For undisclosed specific technical details, refer to the embodiments of this application.

Further, an embodiment of this application provides a communications system, and the communications system may include the UE shown in any one of the foregoing embodiments.

Optionally, an embodiment of this application provides a. communications system, and the communications system may include the UE shown in any one of the foregoing embodiments and the second base station shown in any one of the foregoing embodiments.

Method steps or algorithm steps described with reference to the content disclosed in this application may be implemented by hardware, or may be implemented by a processor by executing a software instruction. The software instruction may include a corresponding software module. The software module may be stored in a RAM, a flash memory, a ROM, an erasable programmable read only memory (Erasable Programmable ROM, EPROM), an electrically erasable programmable read only memory (Electrically EPROM, EEPROM), a register, a hard. disk, a removable hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in a core network interface device. Certainly, the processor and the storage medium may exist in the core network interface device as discrete components.

It may be clearly understood by a person skilled in the art that, for convenient and brief description, for a detailed working process of the foregoing described system, apparatus, and unit, reference may be made to a corresponding process in the foregoing method embodiments. Details are not described herein.

A person skilled in the art should be aware that in the foregoing one or more examples, the functions described in this application may be implemented by hardware, software, firmware, or any combination thereof. When the functions are implemented by software, the foregoing functions may be stored in a computer-readable medium or transmitted as one or more instructions or code in the computer-readable medium. The computer-readable medium includes a computer storage medium and a communications medium. The communications medium includes any medium that enables a computer program to be transmitted from one place to another. The storage medium may be any available medium accessible to a general-purpose or dedicated computer. It may be clearly understood by a person skilled in the art that, for convenient and brief description, for a detailed working process of the foregoing described system, apparatus, and unit, reference may be made to a corresponding process in the foregoing method embodiments. Details are not described herein.

In the several embodiments provided in this application, it should be understood that the disclosed system, apparatus, and method may be implemented in other manners. For example, the described apparatus embodiment is merely an example. For example, the unit division is merely division of logical functions, and may be other division during actual implementation. For example, a plurality of units or components may be combined or integrated into another system, or some features may be ignored or not performed. In addition, the displayed or discussed mutual couplings, or direct couplings, or communication connections may be implemented. through some interfaces. The indirect couplings or communication connections between the apparatuses or units may be implemented electronically or in another form.

The units described as separate parts may or may not be physically separate; and parts displayed as units may or may not be physical units, may be located in one position, or may be distributed on a plurality of network units. Some or all of the units may be selected based on an actual requirement to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, a network device, or the like) to perform some of the steps of the methods described in the embodiments of this application. The foregoing storage medium includes any medium that can store program code, such as a USB flash drive, a removable hard disk, a read-only memory (Read-Only Memory, ROM), a random access memory (Random Access Memory, RAM), a magnetic disk, or an optical disc.

Finally, it should be noted that the foregoing embodiments are merely intended for describing the technical solutions of this application, but not for limiting this application. Although this application is described in detail with reference to the foregoing embodiments, a person of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A service transmission method implemented by a user equipment (UE), the service transmission method comprising:
   sending a first signal on a first symbol set on a first carrier using a first transmit power configured by a first base station, wherein the first signal comprises at least one of a first data signal, a first control signal, a first reference signal, or a first access signal; and
   sending a second signal on a second symbol set on a second carrier using a second transmit power, wherein the second transmit power is less than or equal to a third transmit power configured by a second base station,
   wherein the second transmit power is either equal to a product of a power adjustment factor of the second transmit power and the third transmit power or equal to zero,
   wherein the power adjustment factor is greater than or equal to zero and less than or equal to one,
   wherein a quantity of symbols comprised in the second symbol set is less than or equal to a total quantity of symbols used for the second signal,
   wherein the second signal comprises at least one of a second data signal, a second control signal, a second reference signal, or a second access signal, and
   wherein a first time resource on the first symbol set overlaps with a second time resource on the second symbol set.

2. The service transmission method of claim 1, wherein after the sending the first signal and after sending the second signal, the method further comprises sending, first indication information of the second transmit power to the second base station.

3. The service transmission method of claim 2, wherein the first indication information comprises power information of the second transmit power, and wherein the power information comprises at least one of an absolute value of the second transmit power, a value of the power adjustment factor, or second indication information of the power adjustment factor.

4. The service transmission method of claim 2, wherein the first indication information indicates that the second transmit power is zero.

5. The service transmission method of claim 2, wherein before sending the first indication information, the service transmission method further comprises:
   receiving third indication information from a third base station, wherein the third indication information indicates a first resource used by the UE to send the first indication information, wherein the first resource comprises at least one of a time resource, a frequency resource, a carrier resource, a space domain resource, ora codeword resource, and wherein the third base station is either the first base station or the second base station; and
   the first indication information to the second base station using the first resource.

6. The service transmission method of claim 2, wherein the first indication information comprises resource information of the second symbol set, and wherein the resource information of the second symbol set comprises at least one of time information, frequency information, carrier information, space domain information, or codeword information.

7. A service transmission method implemented by a first base station, the service transmission method comprising:
   receiving first indication information from a user equipment (UE),
   wherein the first indication information comprises power information of a second transmit power on a second carrier or resource information of a second symbol set on the second carrier,
   wherein the power information comprises at least one of an absolute value of the second transmit power, a value of a power adjustment factor of the second transmit power, or second indication information of the power adjustment factor,
   wherein the resource information of the second symbol set comprises at least one of time information, frequency information, carrier information, space domain information, or codeword information,
   wherein a first signal received from the UE comprises a first symbol set on a first carrier using a first transmit power, and a second signal on the second symbol set on the second carrier using the second transmit power, wherein the second signal comprises at least one of a data signal, a control signal, a reference signal, or an access signal,
   wherein a first time resource on the first symbol set overlaps with a second time resource on the second symbol set,
   wherein the first transmit power is configured or indicated by a second base station, and
   wherein the second transmit power is less than or equal to a third transmit power configured or indicated by the first base station; and
   performing, based on the power information, power compensation on the second signal; and
   demodulating, based on the first indication information, the second signal.

8. The service transmission method of claim 7, further comprising:
   determining that the second symbol set comprises a demodulation reference signal of the second carrier; and
   demodulating, based on the demodulation reference signal, another signal on the second carrier except the second symbol set after performing the power compensation on the second signal.

9. The service transmission method of claim 7, wherein the first indication information indicates that the second transmit power is zero, and the demodulating, by the second base station based on the first indication information, the wherein before demodualting the second signal, the service transmission method further comprises setting the second signal as a prior signal.

10. The service transmission method of claim 7, wherein the first indication information indicates that the second transmit power is zero, and wherein the service transmission method further comprises:
setting the second signal as a prior signal; and
demodulating, using the prior signal, a third signal received at a location on the second carrier except the second symbol set.

11. The service transmission method of claim 7, wherein before receiving the first indication information, the service transmission method further comprises sending third indication information to the UE, wherein the third indication information indicates a first resource used by the UE to send the first indication information, and wherein the first resource comprises at least one of a time resource, a frequency resource, a carrier resource, a space domain resource, or a codeword resource and wherein receiving the first indication information comprises receiving, using the first resource, the first indication information from the UE.

12. The service transmission method of claim 7, wherein the first indication information indicates that the second transmit power is zero, and wherein the service transmission method further comprises directly demodulating the second signal.

13. The service transmission method of claim 7, wherein the first indication information indicates that the second transmit power is zero, and wherein the service transmission method further comprises skipping the second signal.

14. A user equipment (UE), comprising:
a transmitter configured to:
send a first signal on a first symbol set on a first carrier using a first transmit power, wherein the first transmit power is configured by a first base station, wherein the first signal comprises at least one of a first data signal, a first control signal, a first reference signal, or a first access signal; and
send a second signal on a second symbol set on a second carrier using a second transmit power, wherein the second transmit power is less than or equal to a third transmit power configured by a second base station, wherein the second transmit power is either equal to a product of a power adjustment factor of the second transmit power and the third transmit power, wherein the power adjustment factor is greater than or equal to zero and less than or equal to one, wherein the second signal comprises at least one of a second data signal, a second control signal, a second reference signal, or a second access signal, wherein a quantity of symbols comprised in the second symbol set is less than or equal to a total quantity of symbols used for the second signal, and wherein a first time resource on the first symbol set overlaps with a second time resource on the second symbol set.

15. The UE of claim 14, wherein the transmitter is further configured to: after the UE sends the first signal on the first symbol set on the first carrier by using the first transmit power, and sends the second signal on the second symbol set on the second carrier by using the second transmit power, send first indication information of the second transmit power to the second base station.

16. The UE of claim 15, wherein the first indication information comprises power information of the second transmit power, and wherein the power information comprises at least one of an absolute value of the second transmit power, a value of the power adjustment factor, or second indication information of the power adjustment factor.

17. The UE of claim 15, wherein the first indication information indicates that the second transmit power is zero.

18. The UE of claim 15, further comprising a receiver coupled to the transmitter, wherein the receiver is configured to receive third indication information from a third base station, wherein the third indication information indicates a first resource used by the UE to send the first indication information, wherein the first resource comprises at least one of time resource, a frequency resource, a carrier resource, a space domain resource, or a codeword resource, wherein the third base station is the first base station, and wherein the transmitter is further configured to send the first indication information to the second base station using the first resource.

19. The UE of claim 15, wherein the first indication information comprises resource information of the second symbol set, and wherein the resource information of the second symbol set comprises at least one of time information, frequency information, carrier information, space domain information, or codeword information.

20. The UE of claim 15, further comprising a receiver coupled to the memory, wherein the instructions further cause the receiver to be configured to receive third indication information from a third base station, wherein the third indication information indicates a first resource used by the UE to send the first indication information, wherein the first resource comprises at least one of a time resource, a frequency resource, a carrier resource, a space domain resource, or a codeword resource, wherein the third base station is the second base station, and wherein the instructions further cause the transmitter to be configured to send the first indication information to the second base station using the first resource.

* * * * *

UNITED STATES PATENT AND TRADEMARK OFFICE
CERTIFICATE OF CORRECTION

PATENT NO. : 11,026,191 B2  
APPLICATION NO. : 16/620332  
DATED : June 1, 2021  
INVENTOR(S) : Yifan Xue et al.

Page 1 of 1

It is certified that error appears in the above-identified patent and that said Letters Patent is hereby corrected as shown below:

In the Claims

Claim 5, Column 38, Line 4: "ora codeword" should read "or a codeword"

Claim 5, Column 38, Line 7: "the first" should read "sending the first"

Claim 9, Column 38, Lines 63-65: "power is zero, and the demodulating, by the second base on the first indication information, the wherein before demodulating" should read "power is zero, wherein before demodulating"

Signed and Sealed this  
Thirteenth Day of July, 2021

Drew Hirshfeld  
*Performing the Functions and Duties of the*  
*Under Secretary of Commerce for Intellectual Property and*  
*Director of the United States Patent and Trademark Office*